US012374286B2

(12) United States Patent
Zhang et al.

(10) Patent No.: US 12,374,286 B2
(45) Date of Patent: Jul. 29, 2025

(54) DISPLAY PANEL FOR INCREASED LIGHT-EMITTING DURATION

(71) Applicants: WUHAN TIANMA MICRO-ELECTRONICS CO., LTD., Wuhan (CN); Wuhan Tianma Microelectronics Co., Ltd. Shanghai Branch, Shanghai (CN)

(72) Inventors: Mengmeng Zhang, Wuhan (CN); Gaojun Huang, Wuhan (CN); Xingyao Zhou, Wuhan (CN); Yue Li, Wuhan (CN)

(73) Assignees: Withan Tianma Micro-Electronics Co., Ltd., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 166 days.

(21) Appl. No.: 18/323,261

(22) Filed: May 24, 2023

(65) Prior Publication Data

US 2023/0298526 A1 Sep. 21, 2023

(30) Foreign Application Priority Data

Aug. 31, 2022 (CN) ........................ 202211062692.3

(51) Int. Cl.
*G09G 3/3233* (2016.01)

(52) U.S. Cl.
CPC ... *G09G 3/3233* (2013.01); *G09G 2310/0262* (2013.01); *G09G 2310/0278* (2013.01); *G09G 2310/061* (2013.01)

(58) Field of Classification Search
CPC .................................................... G09G 3/3233
See application file for complete search history.

(56) References Cited

U.S. PATENT DOCUMENTS

2019/0333596 A1* 10/2019 Zhu ...................... G11C 19/287
2021/0104196 A1* 4/2021 Yuan .................... G09G 3/3266

FOREIGN PATENT DOCUMENTS

CN 107452339 A 12/2017
CN 108573734 A 9/2018
(Continued)

OTHER PUBLICATIONS

Chinese Office Action mailed Apr. 10, 2024, issued in related Chinese Application No. 202211062692.3 filed Aug. 31, 2022, 26 pages.

*Primary Examiner* — Gustavo Polo
(74) *Attorney, Agent, or Firm* — Christensen O'Connor Johnson Kindness PLLC

(57) ABSTRACT

Provided are display panel, method for driving same, and display device. Display panel includes pixel circuit and cascaded first shift circuits. Pixel circuit includes drive transistor and adjusting module electrically connected to first scan line, adjusting line and first electrode of drive transistor. First shift circuit is electrically connected to first scan line and includes first control module and first output module. First control module is electrically connected to first type-A clock line, first shift control line and first control node, and configured to write first shift control signal into first control node in response to first type-A clock signal from first type-A clock line. First output module is electrically connected to first control node, first type-B clock line and first scan line, and configured to write first type-B clock signal into first scan line in response to signal of first control node.

25 Claims, 9 Drawing Sheets

(56) References Cited

FOREIGN PATENT DOCUMENTS

| | | | |
|---|---|---|---|
| CN | 112102785 | A | 12/2020 |
| CN | 113129833 | A | 7/2021 |
| CN | 114514573 | A | 5/2022 |

* cited by examiner

DISPLAY PANEL FOR INCREASED LIGHT-EMITTING DURATION

CROSS-REFERENCE TO RELATED APPLICATIONS

The present application claims priority to Chinese Patent Application No. 202211062692.3 filed on Aug. 31, 2022, the content of which is incorporated herein by reference in its entirety.

TECHNICAL FIELD

The present disclosure relates to the field of display technology, and in particular, to a display panel, a method for driving the display panel, and a display device.

BACKGROUND

With development of display technology, users have higher and higher requirements for the performance of a display panel in all aspects. However, based on a structure of the existing display panel, the light-emitting time during which the light-emitting element emits light is short within one frame time. Especially, for a wearable display panel and the like, the number of rows of sub-pixels is small, and the light-emitting time during which the light-emitting element emits light can only reach 70%-80% of the one frame time. In this case, the light-emitting brightness of the light-emitting element needs to be increased by increasing a power supply voltage. As a result, the display panel has large power consumption.

SUMMARY

In view of this, embodiments of the present disclosure provide a display panel, a method for driving a display panel, and a display device, aiming to increase the light-emitting duration of the light-emitting element within one frame time.

In an aspect, an embodiment of the present disclosure provides a display panel, including: a pixel circuit and first shift circuits that are cascaded. The pixel circuit includes a drive transistor and an adjusting module. The adjusting module is electrically connected to a first scan line, an adjusting line and a first electrode of the drive transistor, respectively. Each of the first shift circuits is electrically connected to the first scan line and includes a first control module and a first output module. The first control module is electrically connected to a first type-A clock line, a first shift control line and a first control node, respectively; and the first control module is configured to write a first shift control signal provided by the first shift control line into the first control node in response to ta first type-A clock signal provided by the first type-A clock line. The first output module is electrically connected to the first control node, a first type-B clock line and the first scan line, respectively, and the first output module is configured to write a first type-B clock signal provided by the first type-B clock line into the first scan line in response to a signal of the first control node.

In another aspect, an embodiment of the present disclosure provides a method for driving the display described above. The method includes: outputting, by each of the first shift circuits, a first scan signal to the first scan line; and controlling the adjusting module in the pixel circuit to write a bias signal provided by the adjusting line into the first electrode of the drive transistor. Said outputting, by each of the first shift circuits, a first scan signal to the first scan line includes: writing, by the first control module, the first shift control signal provided by the first shift control line into the first control node in response to the first type-A clock signal provided by the first type-A clock line; and writing, by the first output module, the first type-B clock signal provided by the first type-B clock line in response to a signal of the first control node.

In still another aspect, an embodiment of the present disclosure provides a display device including the display device described above.

DRIVING TRANSISTOR BRIEF DESCRIPTION OF DRAWINGS

In order to more clearly illustrate technical solutions in embodiments of the present disclosure, the accompanying drawings used in the embodiments are briefly introduced as follows. It should be noted that the drawings described as follows are merely part of the embodiments of the present disclosure, other drawings can also be acquired by those skilled in the art.

DESCRIPTION OF EMBODIMENTS

For better illustrating technical solutions of the present disclosure, embodiments of the present disclosure will be described in detail as follows with reference to the accompanying drawings.

It should be noted that, the described embodiments are merely exemplary embodiments of the present disclosure, which shall not be interpreted as providing limitations to the present disclosure. All other embodiments obtained by those skilled in the art according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association relationship describing associated objects, indicating that there may be three relationships, for example, A and/or B may indicate that three cases, i.e., A existing individually, A and B existing simultaneously, B existing individually. In addition, the character "/" herein generally indicates that the related objects before and after the character form an "or" relationship.

An organic light-emitting diode (Organic Light-Emitting Diode, OLED) display panel includes sub-pixels, and each of the sub-pixels includes a pixel circuit and a light-emitting element that are electrically connected to each other. The pixel circuit includes a drive transistor and switch transistors. Based on cooperation between the drive transistor and the switch transistors, the pixel circuit transmits a drive current to the light-emitting element to drive the light-emitting element to emit light.

In order to improve the display performance of the OLED display panel under low frequency display, the pixel circuit can be adjusted in the following two aspects according to the embodiments of the present disclosure.

Figure 1:
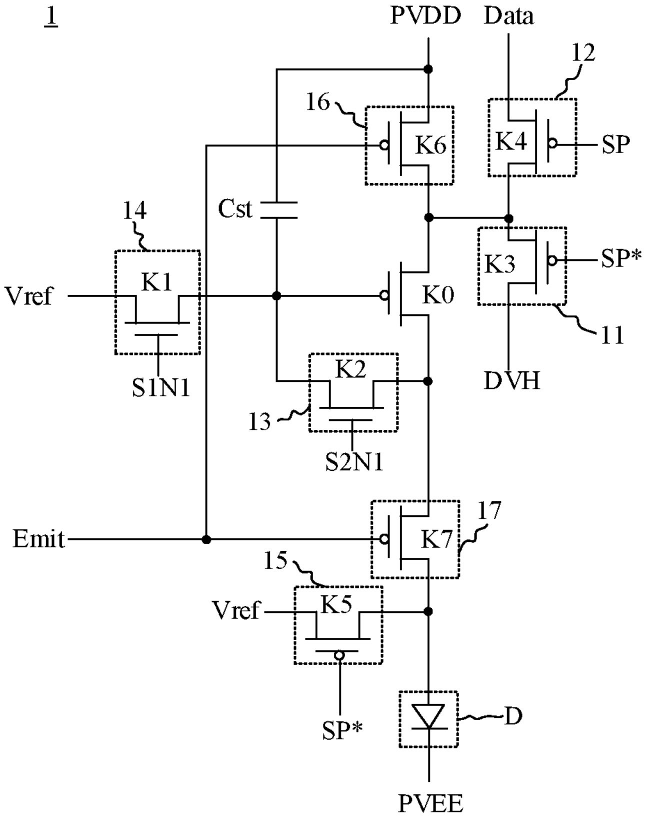
FIG. 1 is a schematic structural diagram of a pixel circuit according to an embodiment of the present disclosure.

In an aspect, a switch transistor electrically connected to a gate electrode of the drive transistor in the pixel circuit can be configured as an indium gallium zinc oxide (IGZO) transistor with a low leakage current. FIG. 1 is a schematic structural diagram of a pixel circuit according to an embodiment of the present disclosure. In an example, as shown in FIG. 1, a gate electrode reset transistor K1 and a threshold compensation transistor K2 electrically connected to the drive transistor K0 in the pixel circuit 1 can be configured as N-type IGZO transistors. In this way, a leakage current of the two transistors has a reduced influence on a potential of the gate electrode of the drive transistor K0.

In another aspect, referring to FIG. 1 again, an adjusting transistor K3 can be provided in the pixel circuit 1, and the adjusting transistor K3 is electrically connected between an adjusting line DVH and a first electrode of the drive transistor K0, to write a bias voltage to the drive transistor K0. Therefore, a bias state of the drive transistor K0 is adjusted, thereby improving the stability of a working state of the drive transistor K0.

However, after changing the transistor types of the gate electrode reset transistor K1 and the threshold compensation transistor K2 and adding the adjusting transistor K3, the display panel needs to be further provided with scan lines for turn on or turn off the gate electrode reset transistor K1, the threshold compensation transistor K2 and the adjusting transistor K3. For example, referring to FIG. 1 again, the display panel needs to be further provided with a first scan line SP* electrically connected to the adjusting transistor K3, a third scan line S1N1 electrically connected to the gate electrode reset transistor K1, and a fourth scan line S2N1 electrically connected to the threshold compensation transistor K2.

As is well known, the scan lines need to use shift registers to provide signals for them. Therefore, after providing the above-mentioned scan lines, the display panel needs to be further provided with shift registers corresponding to the scan lines. As a result, the display panel includes a large number of shift registers, which may lead to a large width of a frame of the display panel.

In an embodiment of the present disclosure, in order to reduce the width of the frame of the display panel, the first scan line SP*, the third scan line S1N1 and the fourth scan line S2N1 may adopt a one-drive-multiple design, that is, a same third scan line S1N1 is electrically connected to multiple rows of pixel circuits 1, a same fourth scan line S2N1 is electrically connected to multiple rows of pixel circuits 1, and a same first scan line SP* is electrically connected to multiple rows of pixel circuits 1. Then, when configuring the timing of the scan signals provided by the above-mentioned scan lines, a during of an enable level of each scan signal can be increased, to include a duration of turn-on of each specific transistor in the multiple rows of pixel circuits 1, thereby achieving normal display of the display panel.

In the above-mentioned configuration, multiple rows of pixel circuits 1 only need to be provided with one shift circuit for providing the first scan signal SP* (for the convenience of illustration, in the embodiments of the present disclosure, each signal is represented by a reference sign of a corresponding signal line), one shift circuit for providing a third scan signal S1N1, and one shift circuit for providing the fourth scan signal S2N1. Therefore, the number of shift circuits that need to be provided in the display panel is effectively reduced, thereby being beneficial for reducing the width of the frame of the display panel.

In an embodiment, when the first scan line SP*, the third scan line S1N1 and the fourth scan line S2N1 adopt a one-drive-multiple design, the shift circuit for providing the first scan signal SP*, the third scan signal S1N1 or the fourth scan signal S2N1 can adopt a first-type shift circuit 2. In a circuit structure of this type of shift circuit, two output transistors are respectively electrically connected to two signal lines, each of which provides a fixed potential.

Figure 2:
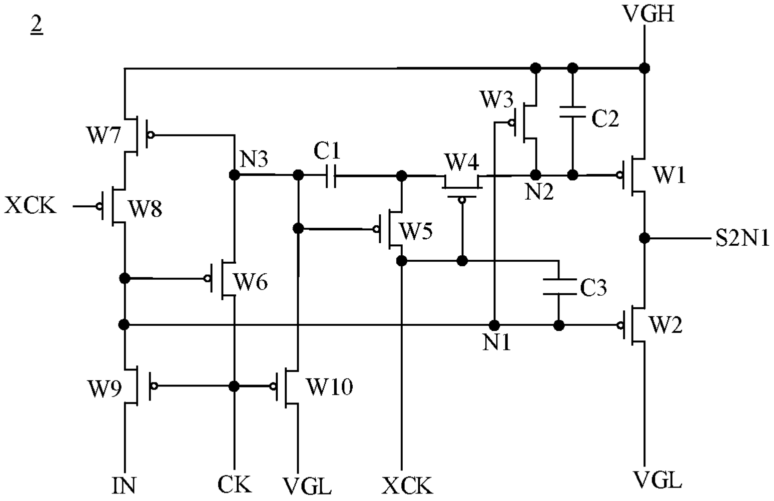
FIG. 2 is a schematic structural diagram of a first-type shift circuit according to an embodiment of the present disclosure.

FIG. 2 is a schematic structural diagram of a first-type shift circuit 2 according to an embodiment of the present disclosure. Taking a circuit structure of the first-type shift circuit 2 shown in FIG. 2 as an example, as shown in FIG. 2, the first-type shift circuit 2 includes a first output transistor W1 and a second output transistor W2. The first output transistor W1 is configured to, when turned on, output a first fixed potential signal (high level) provided by a first fixed potential signal line VGH. The second output transistor W2 is configured to, when turned on, output a second fixed potential signal (low level) provided by a second fixed potential line VGL. Since each of the first fixed potential signal and the second fixed potential signal is a constant voltage signal, by adopting the first-type shift circuit 2, a high level is always output when the first output transistor W1 is continuously turned on, and a low level is always output when the second output transistor W2 is continuously turned on.

However, after further research, the inventor has found out that the first-type shift circuit 2 brings some limitations to the signal output therefrom.

A working process of the first-type shift circuit 2 is described below by taking the electrical connection between the first-type shift circuit 2 and the fourth scan line S2N1 as an example.

When the first-type shift circuit 2 is electrically connected to the fourth scan line S2N1, a gate electrode of the first output transistor W1 is electrically connected to a second node N2, and a second electrode of the first output transistor W1 is electrically connected to the first fixed potential signal line VGH, an a second electrode of the first output transistor W1 is electrically connected to a fourth scan line S2N1; a gate electrode of the second output transistor W2 is electrically connected to a first node N1, a first electrode of the second output transistor W2 is electrically connected to a second fixed potential signal line VGL, and a second electrode of the second output transistor W2 is electrically connected to the fourth scan line S2N1.

Referring to FIG. 2, the first-type shift circuit 2 may further include a third switch transistor W3, a fourth switch transistor W4, a fifth switch transistor W5, a sixth switch transistor W6, a seventh switch transistor W7, an eighth switch transistor W8, a ninth switch transistor W9, a tenth switch transistor W10, a first capacitor C1, a second capacitor C2, and a third capacitor C3.

A gate electrode of the third switch transistor W3 is electrically connected to the first node N1, a first electrode of the third switch transistor W3 is electrically connected to the first fixed potential signal line VGH, and a second electrode of the third switch transistor W3 is electrically connected to the second node N2.

A gate electrode of the fourth switch transistor W4 is electrically connected to a type-B clock line XCK, and a second electrode of the fourth switch transistor W4 is electrically connected to the second node N2.

A gate electrode of the fifth switch transistor W5 is electrically connected to a third node N3, a first electrode of the fifth switch transistor W5 is electrically connected to a type-B clock line XCK, and a second electrode of the fifth switch transistor W5 is electrically connected to a first electrode of the fourth switch transistor W4.

A gate electrode of the sixth switch transistor W6 is electrically connected to the first node N1, a first electrode of the sixth switch transistor W6 is electrically connected to a type-A clock line CK, and a second electrode of the sixth switch transistor W6 is electrically connected to the third node N3.

A gate electrode of the seventh switch transistor W7 is electrically connected to the third node N3, and a first electrode of the seventh switch transistor W7 is electrically connected to the first fixed potential signal line VGH.

A gate electrode of the eighth switch transistor W8 is electrically connected to the type-B clock line XCK, a first electrode of the eighth switch transistor W8 is electrically connected to the first node N1, and a second electrode of the eighth switch transistor W8 is electrically connected to a second electrode of the seventh switch transistor W7.

A gate electrode of the ninth switch transistor W9 is electrically connected to the type-A clock line CK, a first electrode of the ninth switch transistor W9 is electrically connected to a shift control line IN, and a second electrode of the ninth switch transistor W9 is electrically connected to the first node N1.

A gate electrode of the tenth switch transistor W10 is electrically connected to the type-A clock line CK, a first electrode of the tenth switch transistor W10 is electrically connected to the second fixed potential signal line VGL, and a second electrode of the tenth switch transistor W10 is electrically connected to the third node N3.

The first capacitor C1 is electrically connected between the third node N3 and the second electrode of the fifth switch transistor W5.

The second capacitor C2 is electrically connected between the first fixed potential signal line VGH and the second node N2.

The third capacitor C3 is electrically connected between the type-B clock line XCK and the first node N1.

Figure 3:
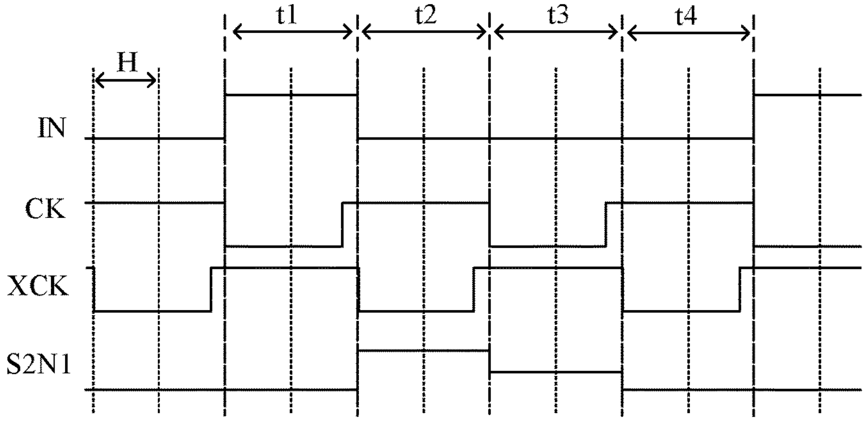
FIG. 3 is a timing diagram corresponding to a first-type shift circuit according to an embodiment of the present disclosure.

FIG. 3 is a timing diagram corresponding to a first-type shift circuit 2 according to an embodiment of the present disclosure. As shown in FIG. 3, a working process of the first-type shift circuit 2 includes a first period t1, a second period t2, a third period t3 and a fourth period t4.

During the first period t1, the shift control line IN provides a high level, the type-A clock line CK provides a low level, the type-B clock line XCK provides a high level, the tenth switch transistor W10 is turned on in response to the low level provided by type-A clock line CK, and the third node N3 is set low. During this period, an output of the first-type shift circuit 2 to the fourth scan line S2N1 maintains at a low level of a previous frame.

During the second period t2, the shift control line IN provides a low level, the type-A clock line CK provides a high level, the type-B clock line XCK provides a low level, the third node N3 maintains at a low level, the seventh switch transistor W7 is turned on in response to the low level of the third node N3, the eighth switch transistor W8 is turned on in response to the low level provided by the type-B clock line XCK, the first node N1 is set high, the fifth switch transistor W5 is turned on in response to the low level of the third node N3, the fourth switch transistor W4 is turned on in response to the low level provided by the type-B clock line XCK, the second node N2 is set low, thereby controlling the first output transistor W1 to be turned on. During this period, the first-type shift circuit 2 outputs a high level to the fourth scan line S2N1.

During the third period t3, the shift control line IN provides a low level, the type-A clock line CK provides a low level, the type-B clock line XCK provides a high level, the ninth switch transistor W9 is turned on in response to the low level provided by the type-A clock line CK, the first node N1 is set low, thereby controlling the second output transistor W2 to be turned on. During this period, the first-type shift circuit 2 outputs a low level to the fourth scan line S2N1.

During the fourth period t4, the shift control line IN provides a low level, the type-A clock line CK provides a high level, the type-B clock line XCK provides a low level, the first node N1 maintains at a low level, and the first-type shift circuit 2 continuously outputs a low level to the fourth scan line S2N1.

Based on the working process described above, during the second period t2, when a second clock signal provided by the type-B clock line XCK jumps from a high level to a low level, the fourth switch transistor W4 starts being turned on, and the second node N2 is set low, thereby controlling the first output transistor W1 to start outputting a high level, until a first clock signal provided by the subsequent type-A clock line CK jumps from a high level to a low level, the ninth switch transistor W9 starts being turned on, and the first node N1 is set low, thereby controlling the third switch transistor W3 to be turned on, and the second node N2 is set low; at the same time, the second output transistor W2 starts outputting a low level. It can be known that the duration during which the first-type shift circuit 2 outputs a high level (enable level) is a duration between a falling edge of the second clock signal and a falling edge of the first clock signal, and this duration is an integer multiple of a row duration H.

Moreover, during the third period t3, since the shift control line IN and type-A clock line CK each provide a low level, a gate-source voltage Vgs of the ninth switch transistor W9 is 0 during this period. Based on the device characteristics of the P-type transistor, when the gate-source voltage Vgs of the ninth switch transistor W9 is 0, the ninth switch transistor W9 is not fully turned on, as a result, the low level provided by the shift control line IN cannot be fully transmitted to the first node N1, then a potential of the first node N1 is thus raised. After the potential of the first node N1 is raised, the second output transistor W2 is not fully turned on, as a result, the second output transistor W2 cannot quickly directly output a low level provided by the second fixed potential signal line VGL and a step appears. That is, a trailing appears, and a duration of the trailing is also an integer multiple of the row duration H.

To sum up, the circuit structure of the first-type shift circuit 2 described above determines that the duration of an enable level output by this type of shift circuit can only be an integer multiple of the row duration H, and trailing appears inevitably.

Since a signal is unstable when the trailing appears, the trailing of the signal usually needs to be avoided in the timing configuration. For example, in combination with FIG. 4 and FIG. 5, within one frame time, a first high level in the fourth scan signal S2N1 shall cover a first trailing of the first scan signal SP*, resulting in a longer duration of the first high level in the fourth scan signal S2N1; and a second trailing of the fourth scan signal S2N1 and a second trailing of the first scan signal SP* shall be staggered, resulting in a long duration between a second high level in the fourth scan signal S2N1 and a second low level of the first scan signal SP*. As a result, when configuring the timing of a light-emitting control signal Emit, a duration of a high level (light-emitting non-enable level) in the light-emitting control signal Emit shall be quite long, leading to a relatively large proportion of a high level in the light-emitting control signal Emit within one frame time, that is, a proportion of the duration during which the light-emitting element does not emit light is relatively large.

In an example, when the first scan line SP* adopts a one-drive-multiple design, a duration of a low level and a duration of a trailing of the first scan signal SP* are doubled, so a proportion of a duration of a high level in the light-emitting control signal Emit is greater.

Figure 4:
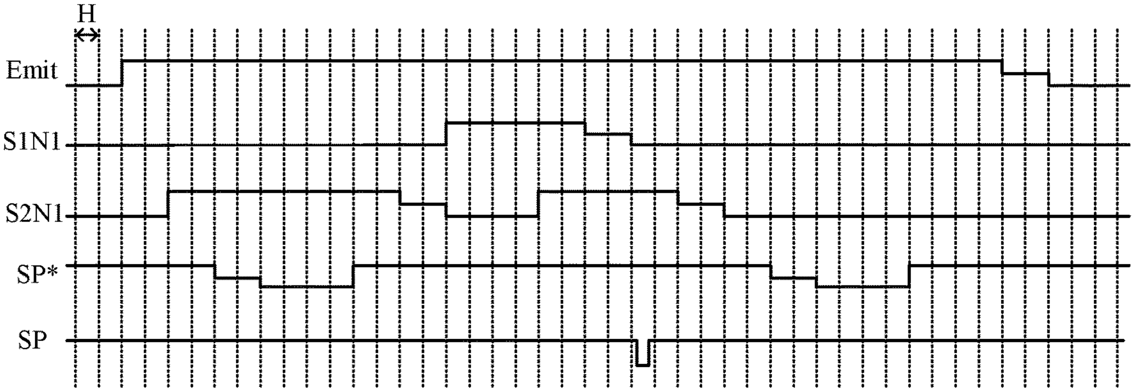
FIG. 4 is a timing diagram corresponding to a pixel circuit when a first scan line adopts a one-drive-two design according to an embodiment of the present disclosure.

FIG. 4 is a timing diagram corresponding to a pixel circuit 1 when a first scan line SP* adopts a one-drive-two design according to an embodiment of the present disclosure. In an example, as shown in FIG. 4, when the first scan line SP* adopts a one-drive-two design, a duration during which the light-emitting control signal Emit is configured to not emit light is equal to 40 times of the row duration H. For example, when the display panel includes 400 rows of sub-pixels and the light-emitting control signal Emit has two pulses within one frame time, then a proportion of a duration of a low level in the light-emitting control signal Emit is equal to 160/200, i.e., 80%.

Figure 5:
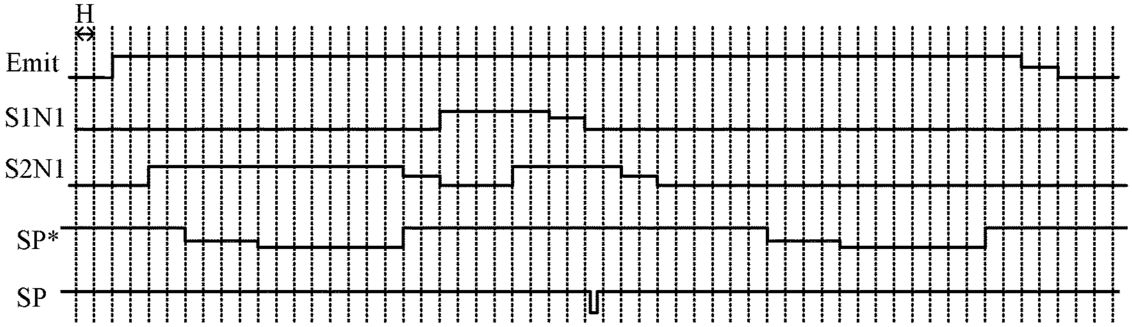
FIG. 5 is a timing diagram corresponding to a pixel circuit when a first scan line adopts a one-drive-four design according to another embodiment of the present disclosure.

FIG. 5 is a timing diagram corresponding to a pixel circuit 1 when a first scan line SP* adopts a one-drive-four design according to an embodiment of the present disclosure. As shown in FIG. 5, when the first scan line SP* adopts a one-drive-four design and a duration during which the light-emitting control signal Emit is configured to not emit light is increased to be equal to 52 times of the row duration H, then a proportion of a duration of a low level in the light-emitting control signal Emit is reduced to be equal to 148/200, i.e., 74%

Therefore, with the configuration described above, the light-emitting control signal Emit needs to be at a high level for a long duration, resulting in a short light-emitting duration of the light-emitting element within one frame time. In this case, in order to achieve high-brightness display, a power supply voltage needs to be increased, which in turn leads to a significant increase in the power consumption of the display panel.

Figure 6:
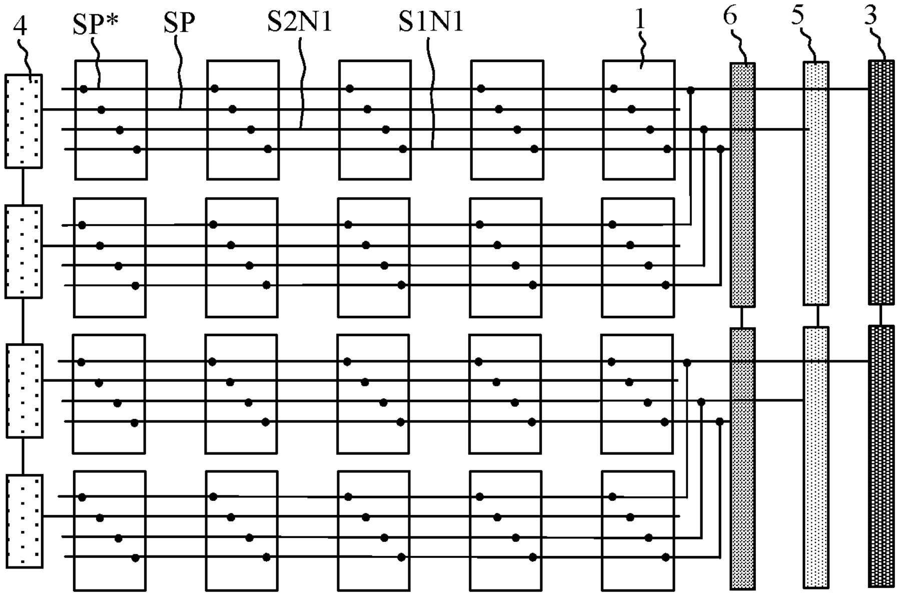
FIG. 6 is a top view of a display panel according to an embodiment of the present disclosure.

In this regard, an embodiment of the present disclosure provides a display panel. FIG. 6 is a top view of a display panel according to the embodiment of the present disclosure. As shown in FIG. 6, the display panel includes a pixel circuit 1 and first shift circuits 3 that are cascaded.

Referring to FIG. 1 again, the pixel circuit 1 includes a drive transistor K0 and an adjusting module 11, and the adjusting module 11 is electrically connected to a first scan line SP*, an adjusting line DVH and a first electrode of the drive transistor K0. In an example, the adjusting module 11 may include an adjusting transistor K3, including a gate electrode electrically connected to the first scan line SP*, a first electrode electrically connected to the adjusting line DVH, and a second electrode electrically connected to the first electrode of the drive transistor K0.

Figure 7:
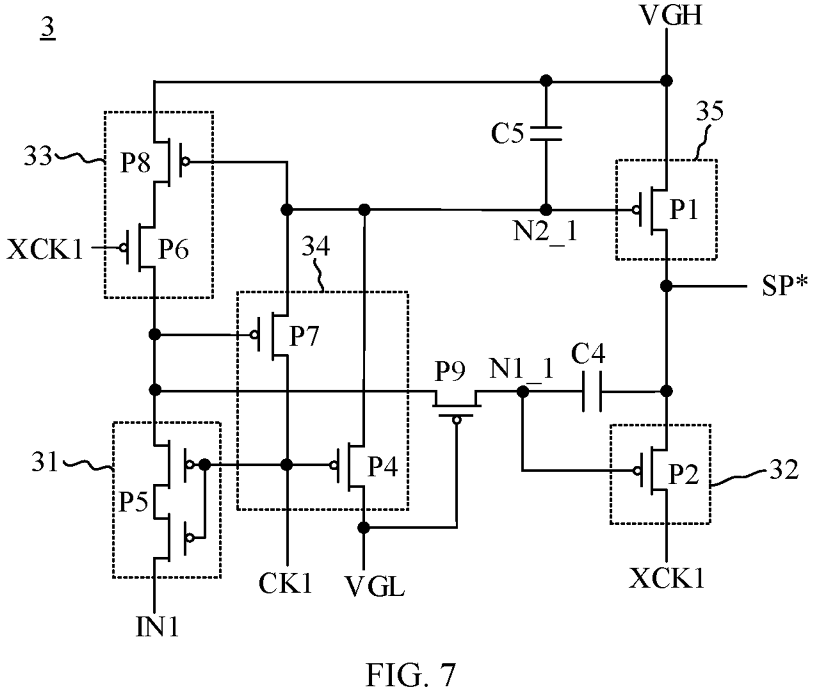
FIG. 7 is a schematic structural diagram of a first shift circuit according to an embodiment of the present disclosure.

FIG. 7 is a schematic structural diagram of a first shift circuit 3 according to an embodiment of the present disclosure. In combination with FIG. 6, as shown in FIG. 7, a first shift circuit 3 is electrically connected to the first scan line SP*. It should be noted that, in an embodiment, one first shift circuit 3 may be electrically connected to only one first scan line SP*, that is, the first shift circuit 3 adopts a one-drive-one design for the first scan line SP*. Or, in another embodiment, referring to FIG. 6, one first shift circuit 3 may be electrically connected to at least two first scan lines SP*, that is, the first shift circuit 3 adopts one-drive-multiple design for the first scan lines SP*.

The first shift circuit 3 includes a first control module 31 and a first output module 32. The first control module 31 is electrically connected to a first type-A clock line CK1, a first shift control line IN1, and a first control node N1_1. The first control module 31 is configured to, in response to a first type-A clock signal CK1 provided by the first type-A clock line, write a first shift control signal IN1 provided by the first shift control line IN1 into the first control node N1_1. The first output module 32 is electrically connected to the first control node N1_1, a first type-B clock line XCK1, and a first scan line SP*. The first output module 32 is configured to, in response to a signal of the first control node N1_1, write a first type-B clock signal XCK1 provided by the first type-B clock line XCK1 into the first scan line SP*.

Figure 8:
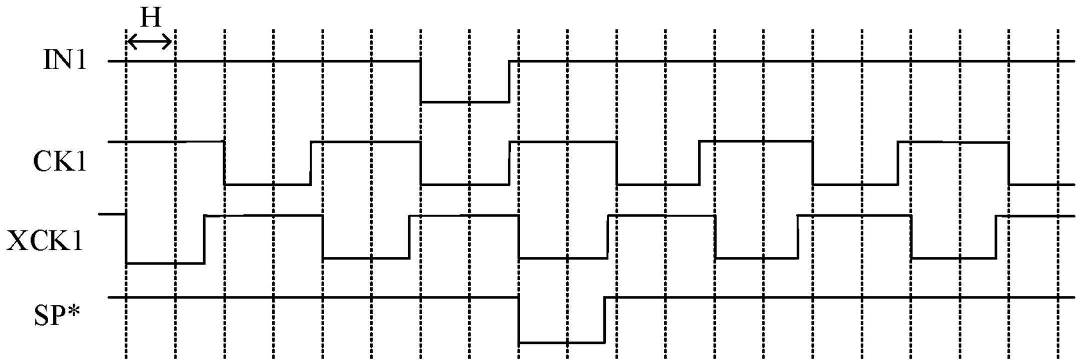
FIG. 8 is a timing diagram corresponding to a first shift circuit according to an embodiment of the present disclosure.

FIG. 8 is a timing diagram corresponding to a first shift circuit 3 according to an embodiment of the present disclosure. In an embodiment, a connection manner of the first control module 31 and the first output module 32 in the first shift circuit 3 is adopted. In an aspect, when the first shift control line IN1 provides a low level, the first type-A clock line CK1 provides a low level, and the first type-B clock line XCK1 provides a high level, the first control module 31 controls a path between the first shift control line IN1 and the first control node N1_1 to be conductive in response to the low level provided by the first type-A clock line CK1, and the low level provided by the first shift control line IN1 is written into the first node N1_1. At this time, the first output module 32 controls a path between the first type-B clock line XCK1 and the first scan line SP* to be conductive in response to a low level, and the high level provided by the first type-B clock line XCK1 is transmitted to the first scan line SP*, to make the first scan line SP* output a high level.

When the signal provided by the first type-A clock line CK1 jumps to a high level, the first control module 31 controls the path between the first shift control line IN1 and the first control node N1_1 to be disconnected, and the first control node N1_1 maintains at a low level that is previously written. When the first type-B clock signal XCK1 subsequently jumps from a high level to a low level, a falling edge of the first type-B clock signal XCK1 will pull a potential of the first control node N1_1 to a lower level due to the parasitic capacitance of the first output module 32, and the first output module 32 controls the path between the first type-B clock line XCK1 and the first scan line SP* to be conductive more fully. Then, when the first type-B clock signal XCK1 is set low, the first output module 32 can quickly and accurately transmit the low level of the first type-B clock line XCK1 to the first scan line SP*, so that no trailing appears when the signal output by the first shift circuit 3 jumps from a high level to a low level.

In this way, when configuring the timing of other signal, there is no need to consider avoiding the trailing of the first scan signal SP*. Exemplarily, in combination with FIG. 11, when configuring the timing of the fourth scan signal S2N1, a first high level in the fourth scan signal S2N1 does not need to consider covering the trailing of the first scan signal SP*, therefore, a duration of the first high level in the fourth scan signal S2N1 can be reduced. At the same time, a duration between a second high level in the fourth scan signal S2N1 and a second low level in the first scan signal SP* can be reduced. Therefore, when configuring the timing of the light-emitting control signal Emit, the duration of a high level in the light-emitting control signal Emit can be correspondingly reduced.

In another aspect, since the second electrode of the first output module 32 is electrically connected to the first type-B clock line XCK1 and the first type-B clock line XCK1 outputs a pulse signal with high levels and low levels that are alternated, a duration during which the first output module 32 outputs a low level to the first scan line SP* lasts for at most a duration of one low level in the first type-B clock signal XCK1. It can be understood that, when configuring the timing, in combination with FIG. 8, a duration between a falling edge of the first type-A clock signal CK1 and a falling edge of the first type-B clock signal XCK1 is equal to an integer multiple of the row duration H, and a duration of a single low level in the first type-A clock signal CK1 and the first type-B clock signal XCK1 is not equal to an integer multiple of the row duration H. Therefore, with this configuration, the duration of a low level output by the first shift circuit 3 is not equal to an integral multiple of the row duration H, thereby reducing the duration of a single low level.

For example, when the first scan line SP* adopts a one-drive-multiple design, if the duration of the low level in the first scan signal SP* needs to be increased, it is not necessary to increase the duration with an integral multiple of the row duration H, therefore, the duration of the low level in the first scan signal SP* can be reduced to a greater extent. Exemplarily, assuming that the display panel adopts the timing shown in FIG. 11, when the first scan line SP* adopts a one-drive-two design, compared with FIG. 4, a duration during which the light-emitting control signal Emit is configured to not emit light is reduced to be equal to 24 times of the row duration H according to this embodiment of the present disclosure. For example, the display panel includes 400 rows of sub-pixels and the light-emitting control signal Emit has two pulses within one frame time, then a proportion of the duration of a low level in the light-emitting control signal Emit can be increased to be equal to 176/200, i.e., 88%. Compared with the configuration shown in FIG. 4, the light-emitting duration is increased by 10%, so the brightness can be increased by 10%.

To sum up, the proportion of the light-emitting duration within one frame time can be increased according to the embodiments of the present disclosure, thereby effectively increasing the light-emitting brightness of the light-emitting element, without needing to increase the power supply voltage to increase the display brightness of the display panel. Therefore, the power consumption of the display panel can be effectively reduced.

In an embodiment, referring to FIG. 1 again, the pixel circuit 1 further includes a data writing module 12, and the data writing module 12 is electrically connected to a second scan line SP, a data line Data and the first electrode of the drive transistor K0. In an example, the data writing module 12 may include a data writing transistor K4, including a gate electrode electrically connected to the second scan line SP, a first electrode electrically connected to the data line Data, and a second electrode electrically connected to the first electrode of the drive transistor K0.

In combination with FIG. 6, the display panel further includes second shift circuits 4 that are cascaded. The second shift circuit 4 is electrically connected to the second scan line SP. It should be noted that, referring to FIG. 6, in an embodiment, one second shift circuit 4 may be electrically connected to one second scan line SP, that is, the second shift circuit 4 adopts a one-drive-one design for the second scan line SP.

Figure 9:
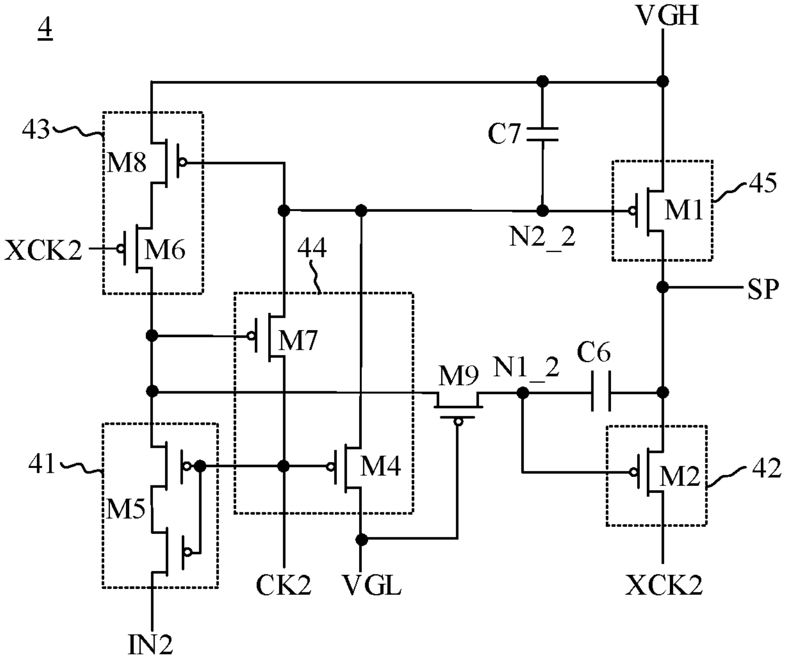
FIG. 9 is a schematic structural diagram of a second shift circuit according to an embodiment of the present disclosure.

FIG. 9 is a schematic structural diagram of a second shift circuit 4 according to an embodiment of the present disclosure. As shown in FIG. 9, the second shift circuit 4 includes a first drive module 41 and a third output module 42. The first drive module 41 is electrically connected to a second type-A clock line CK2, a second shift control line IN2, and a first drive node N1_2. The first drive module 41 is configured to, in response to the second type-A clock signal CK2 output by the second type-A clock line CK2, write a second shift control signal IN2 provided by the second shift control line IN2 into the first drive node N1_2. The third output module 42 is electrically connected to the first drive node N1_2, a second type-B clock line XCK2, and a second scan line SP. The third output module 42 is configured to, in response to the signal of the first drive node N1_2, write a second type-B clock signal XCK2 provided by the second type-B clock line XCK2 into the second scan line SP.

Figure 10:
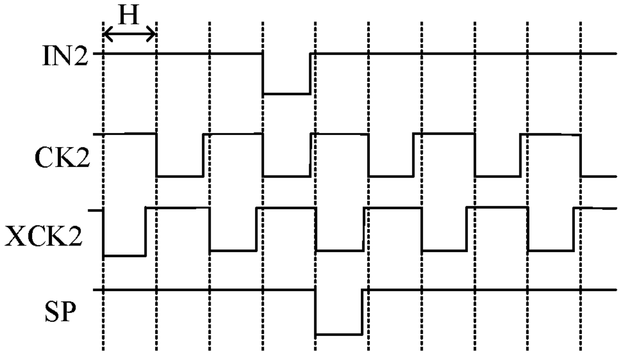
FIG. 10 is a timing diagram corresponding to a second shift circuit according to an embodiment of the present disclosure.

In this embodiment, the second scan line SP and the first scan line SP* correspond to a same type of shift circuit. FIG. 10 is a timing diagram corresponding to a second shift circuit 4 according to an embodiment of the present disclosure. Combined with the above analysis of the working process of the first shift circuit 3, as shown in FIG. 10, by using the second shift circuit 4 to transmit the signal to the second scan line SP, a trailing of the second scan signal SP can be avoided, and a duration of a single low level in the second scan signal SP does not need to be an integer multiple of the row duration H. Since the second scan signal SP is configured to control electric charging of the pixel circuit 1, the trailing of the second scan signal SP being avoided can effectively improve the stability of the second scan signal SP, thereby improving the electric charging reliability of the pixel circuit 1 and improving the control of the light-emitting state of the light-emitting element.

In addition, it should also be noted that, according to a related design, the first scan line SP* and the second scan line SP correspond to a same group of shift registers, that is, the first scan line SP* and the second scan line SP that are electrically connected to a same pixel circuit 1 are electrically connected to different shift circuits in a same shift register, that is, the two performs borrowing for different shift circuits. For example, the first scan line SP* electrically connected to the pixel circuit 1 in an i-th row is electrically connected to an (i-2)-th shift circuit, and the second scan line SP* electrically connected to the pixel circuit 1 in the i-th row is electrically connected to an i-th shift circuit. Based on this configuration, during the working process of the pixel circuit 1, first of all, the (i-2)-th shift circuit outputs a low level to the first scan line SP*, and the adjusting module 11 is controlled to write a bias voltage provided by the adjusting line DVH into the drive transistor K0, to refresh a potential of the drive transistor K0; then, the i-th shift circuit outputs a low level to the second scan line SP, and the data writing module 12 is controlled to write a data voltage into the drive transistor K0. Therefore, in this configuration, the bias voltage can only be written into the drive transistor K0 once before the pixel circuit 1 writes the data voltage.

However, when the display panel performs low-frequency displaying, since the data voltage is written by the pixel circuit 1 only within a writing frame and is not continuously written within a subsequent longer maintaining frame, after the data voltage is written to the drive transistor K0, the first electrode of the drive transistor K0 has a current leakage for a long period. At this time, if a bias state of the drive transistor K0 is not adjusted, it will be difficult to keep the working state of the drive transistor K0 stable.

In the embodiments of the present disclosure, the first scan line SP* and the second scan line SP correspond to two different groups of shift registers. In this case, the timing of the first scan signal SP* and the timing of the second scan signal SP do not need to mutually restrict each other, so that the timing of the first scan signal SP* can be configured more flexibly. For example, before and after the data voltage is written into the drive transistor K0, the first scan signal SP* can control a bias module 11 to write the bias voltage to the drive transistor K0 respectively to adjust the drive transistor K0 multiple times, thereby further improving the stability of the working state of the drive transistor K0.

Further, referring to FIG. 1 again, the pixel circuit 1 further includes a threshold compensation module 13, and the threshold compensation module 13 is electrically connected to a fourth scan line S2N1, the second electrode of the drive transistor K0, and the gate electrode of the drive transistor K0, respectively. In an example, the threshold compensation module 13 may include a threshold compensation transistor K2, including: a gate electrode electrically connected to the fourth scan line S2N1, a first electrode electrically connected to the second electrode of the drive transistor K0, and a second electrode electrically connected to the gate electrode of the drive transistor K0.

Referring to FIG. 6 again, the display panel further includes fourth shift circuits 5 that are cascaded. The fourth shift circuit 5 is electrically connected to the fourth scan line S2N1. It should be noted that, in an embodiment, one fourth shift circuit 5 may be electrically connected to one fourth scan line S2N1, that is, the fourth shift circuit 5 adopts a one-drive-one design for the fourth scan line S2N1. In another arrangement, referring to FIG. 6, one fourth shift circuit 5 may be electrically connected to at least two fourth scan lines S2N1, that is, the fourth shift circuit 5 adopts a one-drive-multiple design for the fourth scan lines S2N1.

Figure 11:
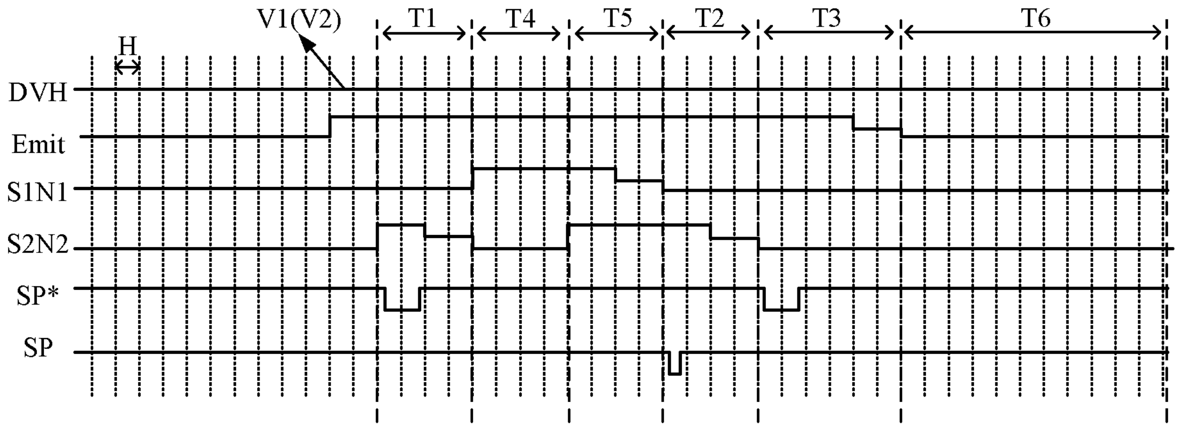
FIG. 11 is a timing diagram corresponding to a pixel circuit according to an embodiment of the present disclosure.

FIG. 11 is a timing diagram corresponding to a pixel circuit 1 according to an embodiment of the present disclosure. As shown in FIG. 11, a driving cycle of the pixel circuit 1 includes a first adjustment period T1, an charging period T2, and a second adjustment period T3. The first adjustment period T1 is before the charging period T2, and the second adjustment period T3 is after the charging period T2.

During the first adjustment period T1 and the second adjustment period T3, the first shift circuit 3 outputs a first enable level (low level) to the first scan line SP*, and the adjusting module 11 is controlled to write a bias signal provided by the adjusting line DVH into the first electrode of the drive transistor K0. During the charging period T2, the second shift circuit 4 outputs a second enable level to the second scan line SP, the fourth shift circuit outputs a fourth enable level to the fourth scan line S2N1, and the data writing module 12 and the threshold compensation module 13 are controlled to write a data signal provided by the data line Data into the gate electrode of the drive transistor K0 to charge the drive transistor K0.

Based on the above-mentioned configuration, the first adjustment period T1 is before the charging period T2, and the adjusting module 11 is used to refresh a potential of the drive transistor K0, so that the device characteristics of the drive transistor K0 can be configured as a certain initial state, thereby eliminating an influence of a data signal written within a previous frame on the device characteristics of drive transistor K0. The second adjustment period T3 is after the charging period T2, so that the adjusting module 11 can be used again to write a bias voltage into the drive transistor K0, and a bias state of the drive transistor K0 can be close to that of the drive transistor K0 when the data voltage is just written, thereby further improving the stability of the working state of the drive transistor K0.

Therefore, the above-mentioned configuration can better adjust the bias state of the drive transistor K0 and improve the working stability of the drive transistor K0 to a greater extent.

In an embodiment, referring to FIG. 1 again, the pixel circuit 1 further includes a gate reset module 14, and the gate reset module 14 is electrically connected to a third scan line S1N1, a reset line Vref and the gate electrode of the drive transistor K0, respectively. In an example, the gate reset module 14 includes a gate electrode reset transistor K1, including a gate electrode electrically connected to the third scan line S1N1, a first electrode electrically connected to the reset line Vref, and a second electrode electrically connected to the gate electrode of the drive transistor K0.

Referring to FIG. 6 again, the display panel further includes third shift circuits 6 that are cascaded. The third shift circuit 6 is electrically connected to the third scan line S1N1. It should be noted that, in an embodiment, one third shift circuit 6 may be electrically connected to one third scan line S1N1, that is, the third shift circuit 6 adopts a one-drive-one design for the third scan line S1N1. In another embodiment, referring to FIG. 6, one third shift circuit 6 may be electrically connected to at least two third scan lines S1N1, that is, the third shift circuit 6 adopts a one-drive-multiple design for the third scan lines S1N1.

Figure 12:
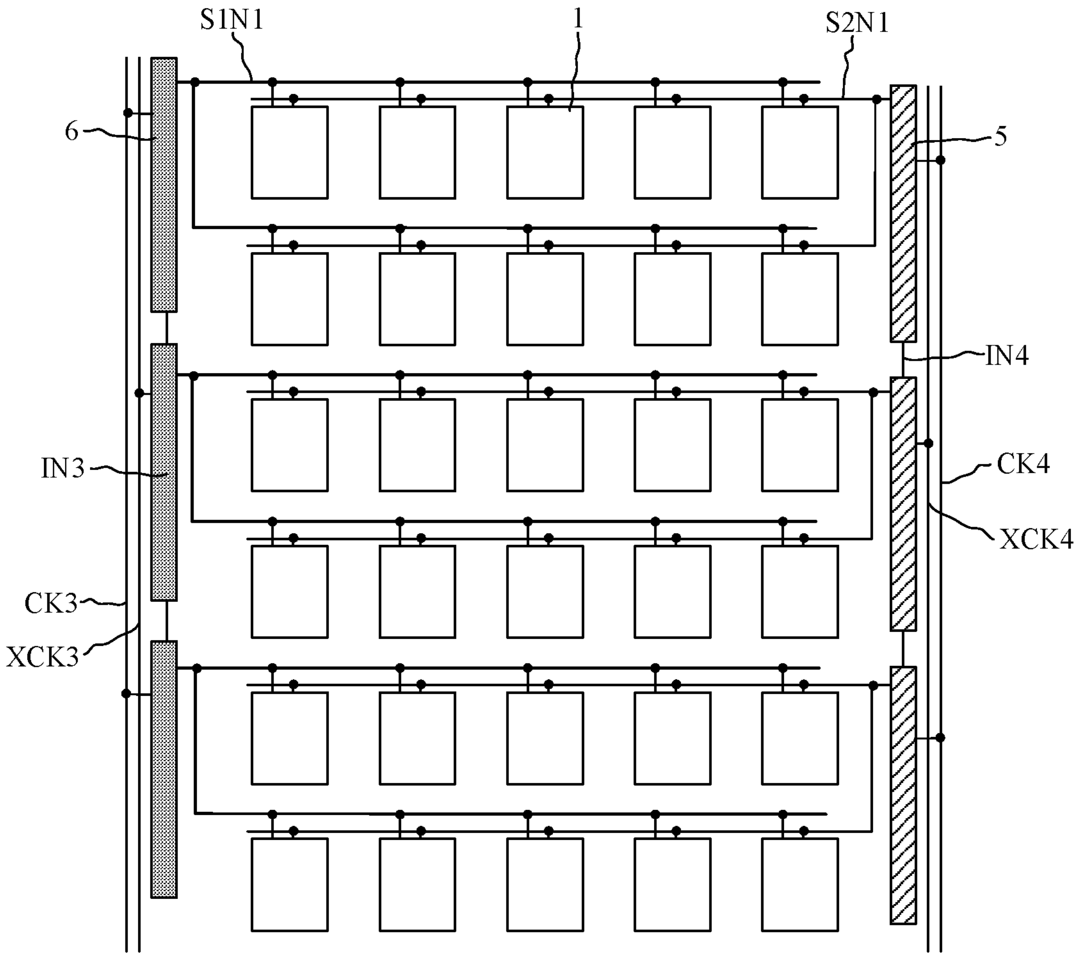
FIG. 12 is another top view of a display panel according to an embodiment of the present disclosure.

FIG. 12 is another top view of a display panel according to an embodiment of the present disclosure. It should be noted that, in an embodiment of the present disclosure, as shown in FIG. 12, the third shift circuit 6 is electrically connected to a third shift control line IN3, a third type-A clock line CK3 and a third type-B clock line XCK3, respectively; and the fourth shift circuit 5 is electrically connected to a fourth shift control line IN4, a fourth type-A clock line CK4 and a fourth type-B clock line XCK4, respectively.

The third shift circuit 6 and the fourth shift circuit 5 can adopt the same structural design as the first-type shift circuit 2 shown in FIG. 2, or can adopt the same structural design as the first shift circuit 3 shown in FIG. 7. Combined with the description of the working process of the two shift circuits, when the third shift circuit 6 and the fourth shift circuit 5 adopt the same structural design as the first-type shift circuit 2 shown in FIG. 2, referring to FIG. 11, the third scan signal S1N1 and the fourth scan signal S2N1 include a trailing. When the third shift circuit 6 and the fourth shift circuit 5 adopt the same structural design as the first shift circuit 3 shown in FIG. 7, referring to FIG. 13, FIG. 15 and FIG. 16, the third scan signal S1N1 and the fourth scan signal S2N1 do not have a trailing.

Figure 13:
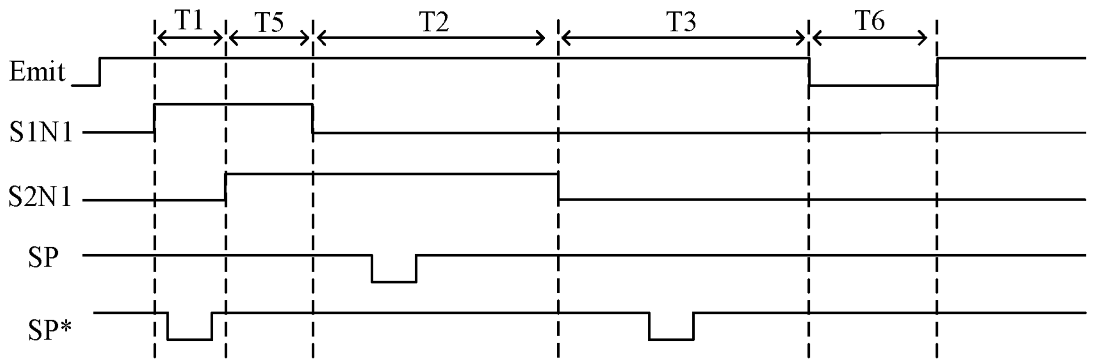
FIG. 13 is another timing diagram corresponding to a pixel circuit according to an embodiment of the present disclosure.
Figure 14:
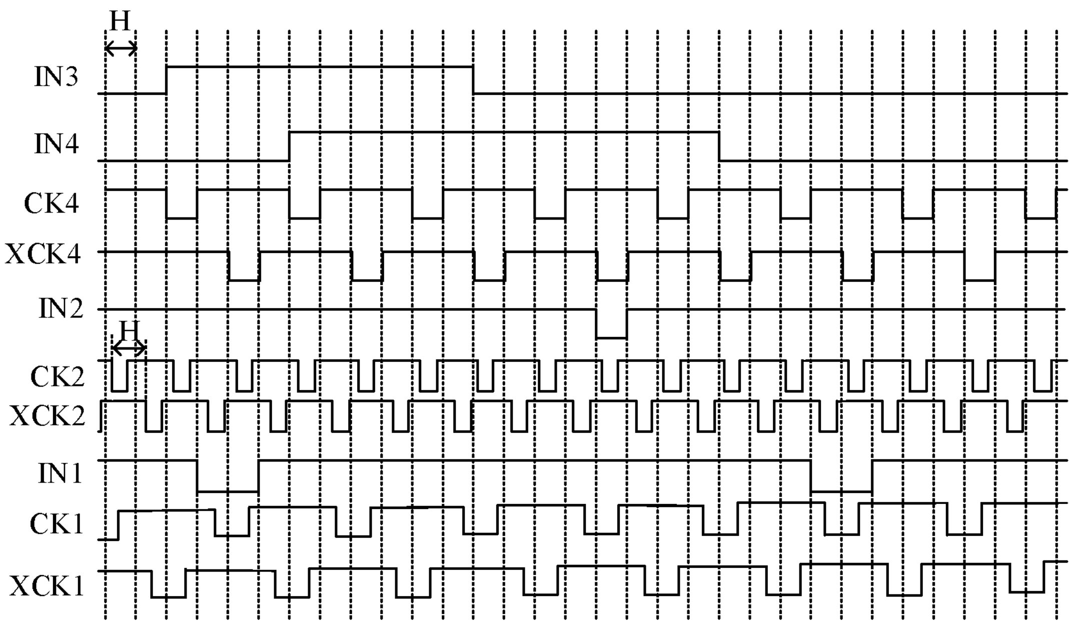
FIG. 14 is a timing diagram corresponding to each shift circuit according to an embodiment of the present disclosure.

FIG. 13 is another timing diagram corresponding to a pixel circuit 1 according to an embodiment of the present disclosure. FIG. 14 is a timing diagram corresponding to each shift circuit according to an embodiment of the present disclosure. During the first adjustment period T1, the third shift circuit 6 outputs a third enable level (high level) to the third scan line S1N1, and the gate reset module 14 is controlled to write a reset signal provided by the reset line Vref into the gate electrode of the drive transistor K0. That is, during the first adjustment period T1, a high level of the third scan signal S1N1 overlaps with a low level of the first scan signal SP*.

Based on the above-mentioned configuration, during the first adjustment period T1, the gate reset module 14 writes a reset voltage to the gate electrode of the drive transistor K0 to control the drive transistor K0 to be turned on, and at the same time, the adjusting module 11 writes a bias voltage to the first electrode of the drive transistor K0, and the bias voltage can be further written into the second electrode of the drive transistor K0 through the turned-on drive transistor K0. In this way, each of a potential of the first electrode and a potential of the second pole of the drive transistor K0 can be refreshed by using the bias voltage.

Moreover, since the reset voltage is low and the bias voltage is high, there is a large voltage difference between the gate electrode and the first electrode of the drive transistor K0 during this period, and the adjusting module 11 can adjust the bias state of the drive transistor K0 more thoroughly. An influence of the data signal written within a previous frame on the device characteristics of the drive transistor K0 can be eliminated to a greater extent.

In an embodiment, referring to FIG. 1 again, the pixel circuit 1 further includes a gate reset module 14, and the gate reset module 14 is electrically connected to the third scan line S1N1, the reset line Vref and the gate electrode of the drive transistor K0, respectively. Referring to FIG. 6 again, the display panel further includes third shift circuit 6 that are cascaded. The third shift circuit 6 is electrically connected to the third scan line S1N1.

Figure 15:
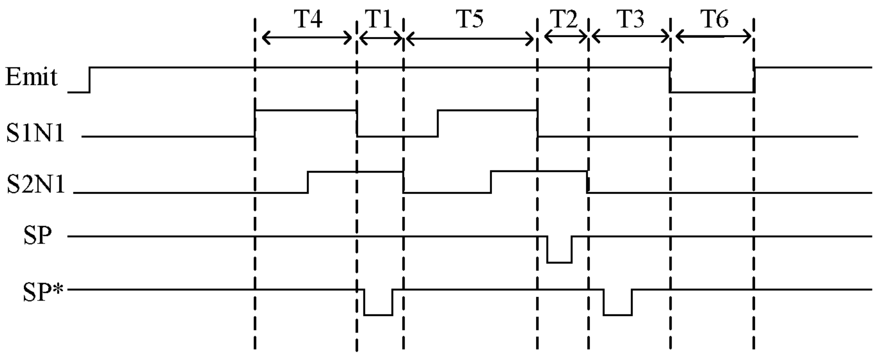
FIG. 15 is still another timing diagram corresponding to a pixel circuit according to an embodiment of the present disclosure.

FIG. 15 is still another timing diagram corresponding to a pixel circuit 1 according to an embodiment of the present disclosure. The driving cycle of the pixel circuit 1 further includes an initialization period T4 before the first adjustment period T1.

During the initialization period T4, the third shift circuit 6 outputs a third enable level (high level) to the third scan line S1N1, and the gate reset module 14 is controlled to write a reset signal provided by the reset line Vref into the gate electrode of the drive transistor K0. During the first adjustment period T1, the fourth shift circuit 5 outputs a fourth enable level (high level) to the fourth scan line S2N1, and the threshold compensation module is controlled to write a bias signal of the second electrode of the drive transistor K0 into the gate electrode of the drive transistor K0.

Based on the above-mentioned configuration, during the initialization period T4, the gate reset module 14 writes a reset voltage to the gate electrode of the drive transistor K0 to control the drive transistor K0 to be turned on. Then, during the subsequent first adjustment period T1, the adjusting module 11 writes a bias voltage into the first electrode of the drive transistor K0, and the bias voltage is further written into the second electrode of the drive transistor K0 through the turned-on drive transistor K0. Further, since the threshold compensation module 13 can control a path between the second electrode and the gate electrode of the drive transistor K0 to be conductive during this period, the bias voltage can be further written into the gate electrode of the drive transistor K0. Therefore, a potential of each electrode of the drive transistor K0 is refreshed. Thus, the device characteristics of the drive transistor K0 are configured as a certain initial state.

Moreover, the initialization period T4 is before the first adjustment period T1, therefore, before the adjusting module 11 performs a first bias adjustment on the drive transistor K0, the gate reset module 14 can be used to write a uniform reset voltage to the gate electrode of the drive transistor K0. In an aspect, as described above, the reset voltage can be used to control the drive transistor K0 to be turned on, and the voltage can be further written into the second electrode after the bias voltage is written into the first electrode of the drive transistor K0. In another aspect, when the threshold compensation module 13 subsequently writes the bias voltage into the gate electrode of the drive transistor K0, it is written on the basis of the reset voltage, which can make the final written bias voltage more uniform, thereby achieving the consistency in the adjustment of the bias state of the drive transistor K0 in each of different pixel circuits 1.

In an embodiment, referring to FIG. 1 again, the pixel circuit 1 further includes a gate reset module 14, and the gate reset module 14 is electrically connected to the third scan line S1N1, the reset line Vref and the gate electrode of the drive transistor K0, respectively. Referring to FIG. 6 again, the display panel further includes cascaded third shift circuits 6. The third shift circuit 6 is electrically connected to the third scan line S1N1.

Figure 16:
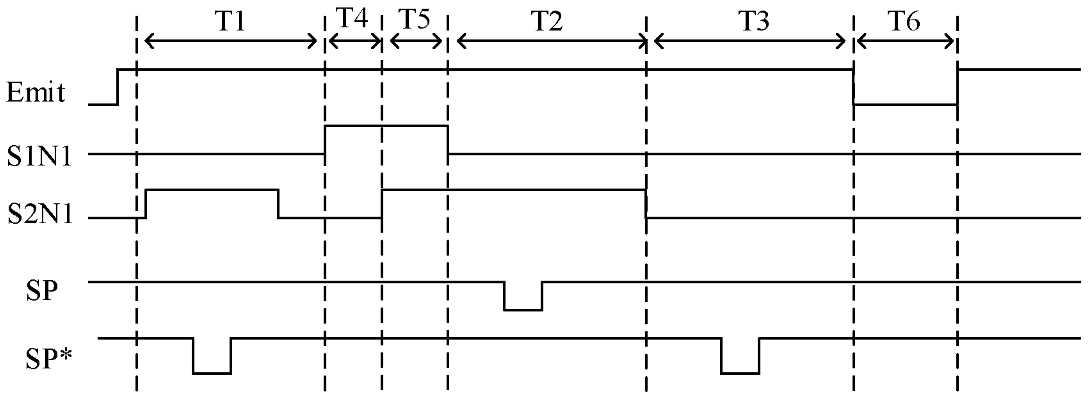
FIG. 16 is still another timing diagram corresponding to a pixel circuit according to another embodiment of the present disclosure.
Figure 17:
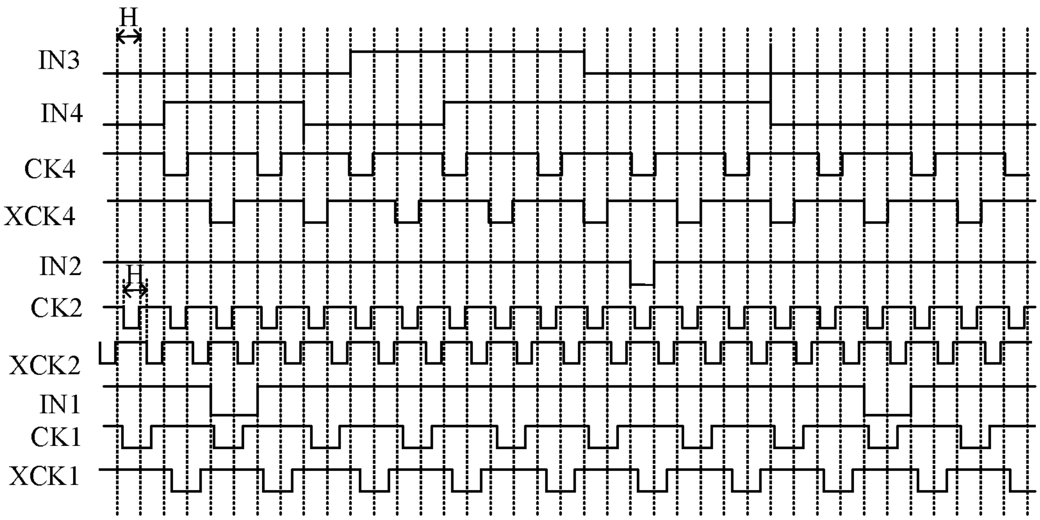
FIG. 17 is another timing diagram corresponding to each shift circuit according to an embodiment of the present disclosure.

FIG. 16 is still another timing diagram corresponding to a pixel circuit 1 according to an embodiment of the present disclosure. FIG. 17 is another timing diagram corresponding to each shift circuit according to an embodiment of the present disclosure. The driving cycle of the pixel circuit 1 further includes an initialization period T4, and the initialization period T4 is between the first adjustment period T1 and the charging period T2.

During the first adjustment period T1, the fourth shift circuit 5 outputs a fourth enable level (high level) to the fourth scan line S2N1, and the threshold compensation module 13 is controlled to write a bias signal of the second electrode of the drive transistor K0 into the gate electrode of the drive transistor K0. During the initialization period T4, the third shift circuit 6 outputs a third enable level to the third scan line S1N1, and the gate reset module 14 is controlled to write a reset signal provided by the reset line Vref into the gate electrode of the drive transistor K0.

Based on the above-mentioned configuration, during the first adjustment period T1, the drive transistor K0 is turned on under an action of the residual potential of the previous frame. After the adjusting module 11 writes a bias voltage into the first electrode of drive transistor K0, the bias voltage is further written into the second electrode of the drive transistor K0 through the turned-on drive transistor K0. Further, since the threshold compensation module 13 can control a path between the second electrode and the gate electrode of the drive transistor K0 to be conductive during this period, the bias voltage can be further written into the gate electrode of the drive transistor K0. Therefore, a potential of each electrode of the drive transistor K0 is refreshed. Thus, the device characteristics of the drive transistor K0 are configured as a certain initial state.

The initialization period T4 is before the charging period T2, so that the gate reset module 14 can be controlled to reset a potential of the gate electrode of the drive transistor K0, thereby achieving initialization of the potential of the gate electrode of the drive transistor K0. Therefore, the stability of the subsequent charging of the pixel circuit 1 can be improved.

In addition, it should also be noted that when the driving cycle of the pixel circuit 1 includes a first adjustment period T1 and a second adjustment period T3, within one frame time, the first scan signal SP* includes a first low level during the first adjustment period T1, and a second low level during the first adjustment period T1.

In an embodiment of the present disclosure, when the first scan line SP* adopts a one-drive-x manner, a duration of a low level in the first scan signal SP* may vary according to a different value of x. Taking the configuration shown in FIG. 16 as an example, as long as a first low level in the first scan signal SP* overlaps with a first high level in the fourth scan signal S2N1 corresponding to each of the pixel circuits 1 in the x rows, and a second low level in the first scan signal SP* is after a second high level in the fourth scan signal S2N1 corresponding to each of the pixel circuits 1 in the last row of the x rows.

Exemplarily, when the first scan line SP* adopts a one-drive-four design, if the above-mentioned condition can be met, the duration of the first low level in the first scan signal SP* can be the same as the duration of a first low level in the first scan signal SP* when the first scan line SP* adopts a one-drive-two design, and the duration of a first low level in the second scan signal SP* can be the same as the duration of a second low level in the first scan signal SP* when the first scan line SP* adopts a one-drive-two design. In this case, the duration during which the light-emitting control signal Emit is configured to not emit light is still equal to 24 times of the row duration H, and a proportion of the duration of a low level in the light-emitting control signal Emit is increased to be equal to 176/200, i.e., 88%. Compared with the configuration shown in FIG. 5, the light-emitting duration is increased by 20%, so the brightness can also be increased by 20%.

In an embodiment, referring to FIG. 1 again, the pixel circuit 1 further includes a gate reset module 14, and the gate reset module 14 is electrically connected to the third scan line S1N1, the reset line Vref and the electrode of the drive transistor K0, respectively. Referring to FIG. 6 again, the display panel further includes third shift circuits 6 that are cascaded. The third shift circuit 6 is electrically connected to the third scan line S1N1.

Referring again to FIG. 11, FIG. 13, FIG. 15 and FIG. 16, the driving cycle of the pixel circuit 1 further includes a reset period T5 between the first adjustment period T1 and the charging period T2. During the reset period T5, the third shift circuit 6 outputs a third enable level to the third scan line S1N1, and the gate reset module 14 is controlled to write a reset signal into the gate electrode of the drive transistor K0; and the fourth shift circuit 5 outputs a fourth enable level to the fourth scan line S2N1, and the threshold compensation module 13 is controlled to write a reset signal of the gate electrode of the drive transistor K0 into the second electrode of the drive transistor K0. It should be noted that, during the reset period T5, when the drive transistor K0 is turned on, a reset signal of the second electrode of the drive transistor K0 can be further written into the first electrode of the drive transistor K0.

In addition, it should also be noted that, with reference to FIG. 16, if an initialization period T4 is between the first adjustment period T1 and the charging period T2, a reset period T5 may be between the initialization period T4 and the charging period T2.

After the adjusting module 11 performs a first bias adjustment on the drive transistor K0, by configuring the reset period T5, the gate reset module 14 and the threshold compensation module 13 can be used to reset each electrode of the drive transistor K0, thereby further improving the reliability of the working state of the drive transistor K0 during the charging period T2.

In an embodiment, referring to FIG. 11 again, the adjusting line DVH provides a first bias voltage V1 during the first adjustment period T1 and provides a second bias voltage V2 during the second adjustment period T3, and the first bias voltage V1 is the same as the second bias voltage V2.

In this case, a bias signal provided by the adjusting line DVH can be directly configured as a direct-current signal to simplify the timing configuration thereof, especially when the first adjustment period T1 and the second adjustment period T3 are close to each other, the bias signal does not need to be voltage switched.

Figure 18:
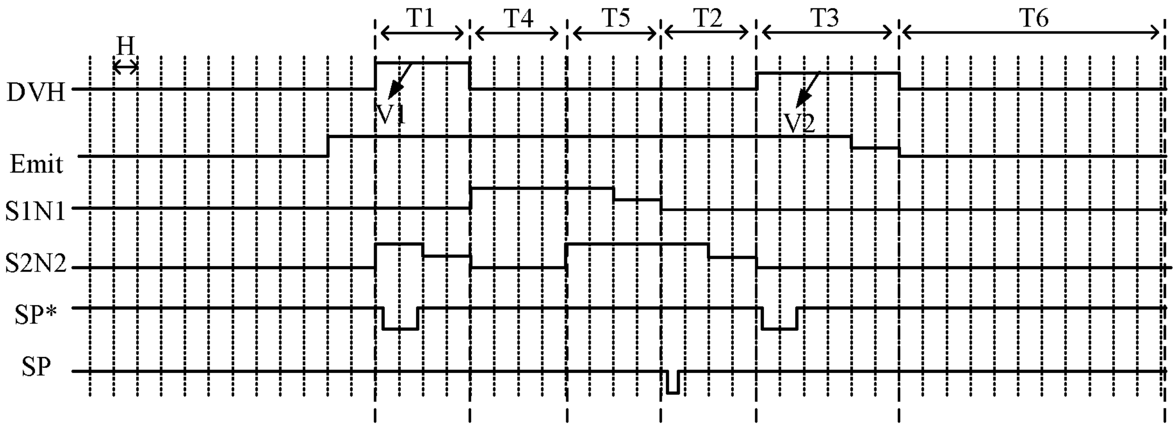
FIG. 18 is yet another timing diagram corresponding to a pixel circuit according to an embodiment of the present disclosure.

In another embodiment, as shown in FIG. 18, which is yet another timing diagram corresponding to a pixel circuit 1 according to an embodiment of the present disclosure, the adjusting line DVH provides a first bias voltage V1 during the first adjustment period T1 and provides a second bias voltage V2 during the second adjustment period T3. The first bias voltage V1 is different from the second bias voltage V2.

In this embodiment of the present disclosure, the adjusting line DVH provides different bias voltages during the first adjustment period T1 and during the second adjustment period T3, therefor, the drive transistor K0 can be in a specific target state during different periods of the wording process of the pixel circuit 1, thereby more precisely adjusting the working state of the drive transistor K0 during different time periods.

In an embodiment, the adjusting line DVH provides a first bias voltage V1 during the first adjustment period T1, and the first bias voltage V1 is greater than or equal to a black state voltage, which may be a data voltage corresponding to 0 gray scale.

Before charging the drive transistor K0, the adjusting module 11 is used to write a first bias voltage V1 greater than or equal to the black state voltage into the drive transistor K0, so that an influence of an image displayed within a previous frame on an image displayed in the current frame can be eliminated. Therefore, the hysteresis and smear of the image displayed on the display panel can be alleviated.

In an embodiment, the adjusting line DVH provides a second bias voltage V2 during the second adjustment period T3, and the second bias voltage V2 is equal to a voltage of a data signal transmitted in the data line Data during the charging period T2.

In this embodiment, the second bias voltage V2 corresponds to a data voltage that needs to be written into the drive transistor K0 in the current working cycle of the pixel circuit 1, that is, a second bias voltage V2 related to the data voltage is written into the drive transistor K0 during the second adjustment period T3. At this time, a bias state of the drive transistor K0 can be consistent with a bias state of the drive transistor K0 during the charging period T2, thereby further improving the stability of the working state of the drive transistor K0.

It should be noted that, in the above-mentioned configuration, when the display panel displays images in different frames, the second bias voltage V2 can be adaptively adjusted according to the data voltage to be written in the current frame during the charging period T2. That is, different frames correspond to different second bias voltages V2 or a same second bias voltage V2.

In an embodiment, the adjusting line DVH provides a second bias voltage V2 during the second adjustment period T3, and the second bias voltage V2 is smaller than or equal to the data voltage corresponding to a first gray scale, which is smaller than or equal to 10 gray scales.

In the above-mentioned configuration, the second bias voltage V2 is a fixed voltage, that is, when the display panel displays images in different frames, the adjusting line DVH provides a same second bias voltage V2 during the second adjustment period T3. It can be understood that the darker an image displayed on the display panel, the more obvious the brightness change caused by the unstable working state of the drive transistor K0, and the easier it is to be seen by the human eye. Therefore, when the second bias voltage V2 is a fixed voltage, the second bias voltage V2 can be configured as a data voltage corresponding to a low gray scale, so that the bias state of the drive transistor K0 displayed at a low gray scale can be more significantly adjusted, thereby improving the image display effect at a low gray scale to a greater extent.

Figure 19:
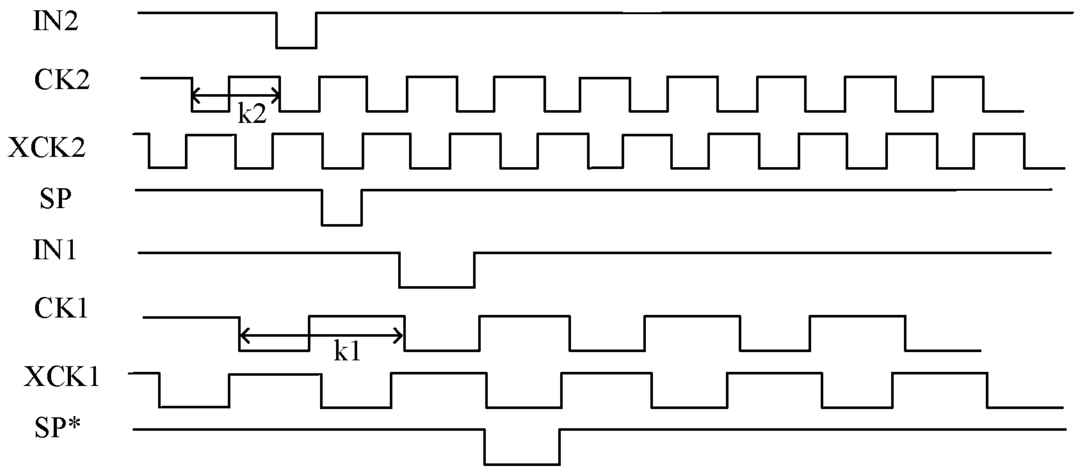
FIG. 19 is still another timing diagram corresponding to each shift circuit according to an embodiment of the present disclosure.

FIG. 19 is still another timing diagram corresponding to each shift circuit according to an embodiment of the present disclosure. In an embodiment, as shown in FIG. 19, the period of the first type-B clock signal XCK1 is k1, the period of the second type-B clock signal XCK2 is k2, and k1>k2.

Figure 20:
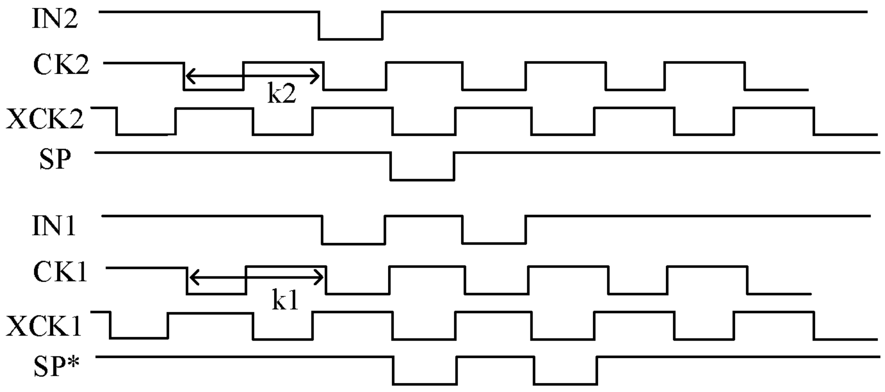
FIG. 20 is yet another timing diagram corresponding to each shift circuit according to another embodiment of the present disclosure.

FIG. 20 is yet another timing diagram corresponding to each shift circuit according to an embodiment of the present disclosure. If k1=k2, as shown in FIG. 20, in order to increase the adjusting duration during which the drive transistor K0 is adjusted by the adjusting module 11 during the first adjustment period T1 or during the second adjustment period T3, it is only possible that the first shift circuit 3 outputs multiple low levels to the first scan line SP* in a time-division manner, so as to utilize the total duration of the multiple low levels to increase the adjusting duration during which the drive transistor K0 is adjusted by the adjusting module 11. This is because the first output module 32 in the first shift circuit 3 is electrically connected to the first type-B clock line XCK1, and the first type-B clock line XCK1 can only output low levels at intervals, so the first shift circuit 3 can only output low levels at interval to the first scan line SP*.

However, this will lead to that a period is required between any two adjacent low levels output by the first shift circuit 3 during the first adjustment period T1 or during the second adjustment period T3. As a result, the duration during which the light-emitting control signal Emit is configured to not emit light needs to be increased, which is not beneficial to increasing the proportion of the light-emitting duration. Moreover, during the first adjustment period T1 or during the second adjustment period T3, the adjusting module 11 performs intermittent adjustments on the drive transistor K0 for many times, so an adjustment effect on the drive transistor K0 is not ideal.

In this regard, referring to FIG. 19 again, in the embodiments of the present disclosure, by increasing the cycle of the first type-A clock signal CK1 and the first type-B clock signal XCK1, the first shift circuit 3 can output a low level to the first scan line SP* for a long period. In an aspect, this is beneficial to increasing the total duration during which the drive transistor K0 is adjusted by the adjusting module 11, especially for wearable display panels, the row duration H is long, and a long duration of the bias can be achieved, and the bias effect can be satisfied. Moreover, on this basis, during the first adjustment period T1 and/or the second adjustment period T3, the adjusting module 11 can continuously adjust the drive transistor K0, and the adjustment effect is better. In another aspect, the total duration required for the first adjustment period T1 and/or the second adjustment period T3 is shorter, so the period of a high level in the second scan signal SP and the light-emitting control signal Emit can be reduced. In still another aspect, the duration of a low level output by the first shift circuit 3 is determined by the duration of a low level in the first type-B clock signal XCK1, therefore, if the duration of the low level output by the first shift circuit 3 needs to be adjusted, it only needs to adjust the duration of the low level in the first type-B clock signal XCK1, and the adjustment method thereof is more flexible and convenient.

In an embodiment, referring to FIG. 14 and FIG. 17 again, the first type-B clock signal XCK1 includes first enable levels (low levels) and first non-enable levels (high levels) that are alternated, and the duration of a single first enable level (low level)) is greater than or equal to one row duration H. Here, the row duration H refers to the minimum interval between a falling edge of the second type-A clock signal CK2 and a falling edge of second type-B clock signal XCK2. The duration of a single low level in the first type-B clock signal XCK1 is greater than or equal to one row duration H, therefore, the adjusting duration during which the drive transistor K0 is adjusted by the adjusting module 11 can be effectively increased, and the working stability of the drive transistor K0 can be further improved.

In an embodiment, referring to FIG. 7 again, the first control module 31 includes a first control transistor P5, including a gate electrode electrically connected to the first type-A clock line CK1, a first electrode electrically connected to the first shift control line IN1, and a second electrode electrically connected to the first control node N1_1. In order to increase the response speed of the first control transistor P5, the first control transistor P5 may be a double-gate transistor.

The first output module 32 includes a first output transistor P2, including a gate electrode electrically connected to the first control node N1_1, a first electrode electrically connected to the first type-B clock line XCK1, and a second electrode electrically connected to the first scan line SP*.

When the first shift control line IN1 provides a low level, the first type-A clock line CK1 provides a low level, and the first type-B clock line XCK1 provides a high level, the first control transistor P5 is turned on in response to the low level provided by the first type-A clock line CK1, and the low level provided by the first shift control line IN1 is written into the first control node N1_1. Then, the first output transistor P2 is controlled to be turned on, so that the first output transistor P2 transmits the high level provided by the first type-B clock line XCK1 to the first scan line SP*, thus the first scan line SP* outputs a high level.

When the signal provided by the first type-A clock line CK1 jumps to a high level, the first control transistor P5 is turned off, the first control node N1_1 maintains at a low level that is previously written, and the first output transistor P2 is controlled to be continuously turned on. When the subsequent first type-B clock signal XCK1 subsequently jumps from a high level to a low level, a falling edge of the first type-B clock signal XCK1 will pull a potential of the first control node N1_1 to a lower level due to the parasitic capacitance of the first output transistor P2, and the first output transistor P2 is turned on more fully. Then, when the first type-B clock signal XCK1 is set low, the first output transistor P2 can quickly and accurately transmit the low level of the first type-B clock line XCK1 to the first scan line SP*, thereby avoiding a trailing.

Further, referring to FIG. 7 again, the first shift circuit 3 further includes a second control module 33, a third control module 34 and a second output module 35.

The second control module 33 is electrically connected to a second control node N2_1, the first fixed potential signal line VGH, the first type-B clock line XCK1 and the first control node N1_1, respectively. The second control module 33 is configured to, in response to the signal of the second control node N2_1 and the first type-B clock signal XCK1, write a first fixed potential signal provided by the first fixed potential signal line VGH into the first control node N1_1, so that the first control node N1_1 is set high.

The third control module 34 is electrically connected to the first type-A clock line CK1, the first control node N1_1, the second fixed potential signal line VGL and the second control node N2_1, respectively. The third control module 34 is configured to: in response to the signal of the first control node N1_1, write the first type-A clock signal CK1 into the second control node N2_1, so that the second control node N2_1 is set high or low. Or, The third control module 34 is configured to: in response to the first type-A clock signal CK1, write a second fixed potential signal provided by the second fixed potential signal line VGL into the second control node N2_1, so that the second control node N2_1 is set low.

The second output module 35 is electrically connected to the second control node N2_1, the first fixed potential signal line VGH and the first scan line SP*, respectively. The second output module 35 is configured to, in response to the signal of the second control node, write the first fixed potential signal into the first scan line SP*, so that the first scan line SP* transmits a high level.

Further, referring to FIG. 7 again, the second control module 33 includes a second control transistor P8 and a third control transistor P6. A gate electrode of the second control transistor P8 is electrically connected to the second control node N2_1, and a first electrode of second control transistor P8 is electrically connected to the first fixed potential signal line VGH. A gate electrode of the third control transistor P6 is electrically connected to the first type-B clock line XCK1, a first electrode of the control transistor P6 is electrically connected to a second electrode of the second control transistor P8, and a second electrode of the third control transistor P6 is electrically connected to the first control node N1_1.

The third control module 34 includes a fourth control transistor P4 and a fifth control transistor P7. A gate electrode of the fourth control transistor P4 is electrically connected to the first type-A clock line CK1, a first electrode of the fourth control transistor P4 is electrically connected to the second fixed potential signal line VGL, and a second electrode of the fourth control transistor P4 is electrically connected to second control node N2_1. A gate electrode of the fifth control transistor P7 is electrically connected to the first control node N1_1, a first electrode of the fifth control transistor P7 is electrically connected to the first type-A clock line CK1, and a second electrode of the fifth control transistor P7 is electrically connected to the second control node N2_1.

The second output module 35 includes a second output transistor P1. A gate electrode of the second output transistor P1 is electrically connected to the second control node N2_1, a first electrode of the second output transistor P1 is electrically connected to the first fixed potential signal line VGH, and a second electrode of the second output transistor P1 is electrically connected to the first scan line SP*.

In addition, the first shift circuit 3 further includes a fourth capacitor C4 and a fifth capacitor C5. The fourth capacitor C4 is electrically connected between the first control node N1_1 and a second electrode of the first output transistor P2. The fifth capacitor C5 is electrically connected between the first fixed potential signal line VGH and the second control node N2_1.

Figure 21:
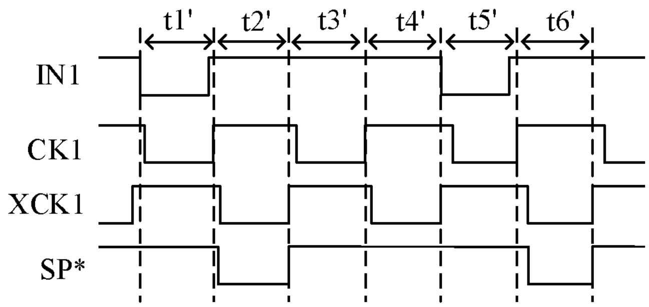
FIG. 21 is another timing diagram corresponding to a first shift circuit according to an embodiment of the present disclosure.

FIG. 21 is another timing diagram corresponding to a first shift circuit 3 according to an embodiment of the present disclosure. As shown in FIG. 21, the working process of the first shift circuit 3 includes a first period t1' to a sixth period t6'. The second period t1' corresponds to the first adjustment period T1 in the working process of the pixel circuit 1, and the sixth period t6' corresponds to the second adjustment period t3 in the working process of the pixel circuit 1. It should be noted that FIG. 21 is merely an exemplary illustration that the working process of the first shift circuit 3 includes a third period t3' and a fourth period t4'. In the actual timing configuration, in order to match the third scan signal S1N1, the fourth scan signal S2N1, etc., the working process of the first shift circuit 3 may include third periods t3' and fourth periods t4' that are alternated.

During the first period t1', the first shift control line IN1 provides a low level, the first type-A clock line CK1 provides a low level, and the first type-B clock line XCK1 provides a high level; the first control transistor P5 is turned on, a low level is written into the first control node N1_1, and the first output transistor P2 is controlled to be turned on; the first output transistor P2 writes a high level into the first scan line SP*, and at the same time, the fourth control transistor P4 is turned on, a low level is written into the second control node N2_1, and the second output transistor P1 is controlled to be turned on; and the second output transistor P1 writes a high level into the first scan line SP*.

During the second period t2', the first shift control line IN1 provides a high level, the first type-A clock line CK1 provides a high level, and the first type-B clock line XCK1 provides a low level; and the first control node N1_1 maintains at a low level, the first output transistor P2 is continuously turned on, and a low level is written into the first scan line SP*.

During the third period t3', the first shift control line IN1 provides a high level, the first type-A clock line CK1 provides a low level, and the first type-B clock line XCK1 provides a high level; the fourth control transistor P4 is turned on, a low level is written into the second control node N2_1, and the second output transistor P1 is controlled to be turned on; and the second output transistor P1 writes a high level into the first scan line SP*.

During the fourth period t4', the first shift control line IN1 provides a high level, the first type-A clock line CK1 provides a high level, and the first type-B clock line XCK1 provides a low level; the second control node N2_1 maintains at a low level, and the second output transistor P1 continuously writes a high level into the first scan line SP*.

During the fifth period t5', the first shift control line IN1 provides a low level, the first type-A clock line CK1 provides a low level, and the first type-B clock line XCK1 provides a high level; the first control transistor P5 is turned on, a low level is written into the first control node N1_1, and the first output transistor P2 is controlled to be turned on; the first output transistor P2 writes a high level into the first scan line SP*, and at the same time, the fourth control transistor P4 is turned on, a low level is written into the second control node, and the second output transistor P1 is controlled to be turned on; and the second output transistor P1 writes a high level into the first scan line SP*.

During the sixth period t6', the first shift control line IN1 provides a high level, the first type-A clock line CK1 provides a high level, and the first type-B clock line XCK1 provides a low level; and the first control node N1_1 maintains at a low level, and the first output transistor P2 writes a low level into the first scan line SP*.

In addition, it should be noted that, referring to FIG. 7 again, the second electrode of the first control transistor P5 may be electrically connected to the first control node N1_1 through a first normally-on transistor P9. A gate electrode of the first normally-on transistor P9 is electrically connected to the second fixed potential signal line VGL, a first electrode of the first normally-on transistor P9 is electrically connected to the second electrode of the first control transistor P5, and a second electrode of the first normally-on transistor P9 is electrically connected to the first control node N1_1. The first normally-on transistor P9 is continuously turned on under an action of a low level provided by the second fixed potential signal line VGL, so as to improve the potential stability of the first control node N1_1.

It should be noted that, referring to FIG. 9 again, the second shift circuit 4 may adopt the same circuit structure as the first shift circuit 3. In an example, the first drive module 41 includes a first drive transistor M5, including: a gate electrode electrically connected to the second type-A clock line CK2, a first electrode electrically connected to a second shift drive line IN2, and a second shift electrically connected to the first drive node N1_2. In order to increase the response speed of the first drive transistor M5, the first drive transistor M5 may be a double-gate transistor.

The first output module 32 includes a third output transistor M2, including: a gate electrode electrically connected to the first drive node N1_2; a first electrode electrically connected to the second type-B clock line XCK2; and a second electrode electrically connected to the second scan line SP.

Further, referring to FIG. 7 again, the second shift circuit 4 further includes a second drive module 43, a third drive module 44 and a fourth output module 45.

The second drive module 43 includes a second drive transistor M8 and third drive transistor M6. A gate electrode of the second drive transistor M8 is electrically connected to a second drive node N2_2, and a first electrode of the second drive transistor M8 is electrically connected to the first fixed potential signal line VGH. A gate electrode of the third drive transistor M6 is electrically connected to the second type-B clock line XCK2, a first electrode of the third drive transistor M6 is electrically connected to a second electrode of the second drive transistor M8, and a second electrode of the third drive transistor M6 is electrically connected to the first drive node N1_2.

The third drive module 44 includes a fourth drive transistor M4 and a fifth drive transistor M7. A gate electrode of the fourth drive transistor M4 is electrically connected to the second type-A clock line CK2, a first electrode of the fourth drive transistor M4 is electrically connected to the second fixed potential signal line VGL, and a second electrode of the fourth drive transistor M4 is electrically connected to the second drive node N2_2. A gate electrode of the fifth drive transistor M7 is electrically connected to the first drive node N1_2, a first electrode of the fifth drive transistor M7 is electrically connected to the second type-A clock line CK2, and a second electrode of the fifth drive transistor M7 is electrically connected to the second drive node N2_2.

The fourth output module 45 includes a fourth output transistor M1, including: a gate electrode electrically connected to the second drive node N2_2, a first electrode electrically connected to the first fixed potential signal line VGH, and a second electrode electrically connected to the first scan line SP*.

In addition, the first shift circuit 3 further includes a sixth capacitor C6 and a seventh capacitor C7. The sixth capacitor C6 is electrically connected between the first drive node N1_2 and the second electrode of the first output transistor P2. The seventh capacitor C7 is electrically connected between the first fixed potential signal line VGH and the second drive node N2_2.

It should be noted that the working process of the second shift circuit 4 is similar to that of the first shift circuit 3, and the description thereof will not be repeated herein. But it should be noted that, unlike the first shift control line IN1, combined with FIG. 10, within one frame time, the second shift control line IN2 provides only a low level, thereby controlling the second shift circuit 4 to output only a low level, which is used to drive the pixel circuit 1 to be charged during the charging period T2.

In addition, referring to FIG. 1 again, the pixel circuit 1 further includes an anode reset module 15, a first lighting control module 16 and a second light-emitting control module 17.

The anode reset module 15 includes an anode reset transistor K5, including: a gate electrode electrically connected to the first scan line SP*, a first electrode electrically connected to the reset line Vref, and a second electrode electrically connected to the light-emitting element D.

The first light-emitting control module 16 includes a first light-emitting control transistor K6, including: a gate electrode electrically connected to a light-emitting control line Emit, a first electrode electrically connected to a power signal line PVDD, and a second electrode electrically connected to the first electrode of the drive transistor K0.

The second light-emitting control module 17 includes a second light-emitting control transistor K7, each of the gate electrodes of the second light-emitting control transistor K7 and the second light-emitting control transistor K7 is electrically connected to the light-emitting control line Emit, a first electrode of the second light-emitting control transistor K7 is electrically connected to the second electrode of the transistor K0, and a second electrode of the second light-emitting control transistor K7 is electrically connected to the light-emitting element D.

In addition, the pixel circuit 1 further includes a storage capacitor Cst electrically connected between the power signal line PVDD and the gate electrode of the drive transistor K0.

Taking FIG. 11 as an example, the working process of the pixel circuit 1 will be described below.

The working process of the pixel circuit 1 includes a first adjustment period T1, an initialization period T4, a reset period T5, an charging period T2, a second adjustment period T3 and a light-emitting period T6.

During the first adjustment period T1, the adjusting transistor K3 is turned on in response to a low level provided by the first scan line SP*, the threshold compensation transistor K2 is turned on in response to a high level provided by the fourth scan line S2N1, and a bias signal provided by the adjusting line DVH is written into the drive transistor K0 to refresh a potential of the drive transistor K0. The anode reset transistor K5 is turned on in response to a low level provided by the first scan line SP*, and a reset signal provided by the reset line Vref is written into an anode of the light-emitting element D to reset a potential of the anode of the light-emitting element D.

During the initialization period T4, the gate electrode reset transistor K1 is turned on in response to a high level provided by the third scan line S1N1, and a reset voltage provided by the reset line Vref is written into the drive transistor K0 to reset a potential of the gate electrode of the drive transistor K0.

During reset period T5, the gate electrode reset transistor K1 is turned on in response to a high level provided by the third scan line S1N1, the threshold compensation transistor K2 is turned on in response to a high level provided by the fourth scan line S2N1, and a reset voltage provided by the reset line Vref is written into each of the gate electrode and the second electrode of the drive transistor K0.

During the charging period T2, the data writing transistor K4 is turned on in response to a low level provided by the second scan line SP, the threshold compensation transistor K2 is turned on in response to a high level provided by the fourth scan line S2N1, and a data signal provided by the data line Data is written into the drive transistor K0 and threshold compensation is performed for the drive transistor K0.

During the second adjustment period T3, the adjusting transistor K3 is turned on in response to a low level provided by the first scan line SP*, the threshold compensation transistor K2 is turned on in response to a high level provided by the fourth scan line S2N1, and a bias signal provided by the adjusting line DVH is written into the drive transistor K0 to adjust a bias state of drive transistor K0. The anode reset transistor K5 is turned on in response to a low level provided by the first scan line SP*, and a reset signal provided by the reset line Vref is written into the anode of the light-emitting element D to reset a potential of the anode of the light-emitting element D. During the light-emitting period T6, the first light-emitting control transistor K6 and the second light-emitting control transistor K7 are turned on in response to a low level provided by the light-emitting control line Emit, and a drive current converted from a power signal provided by the power signal line PVDD and a data signal provided by the data line Data is transmitted to the light-emitting element D, to drive the light-emitting element D to emit light.

In addition, it should also be noted that, referring to FIG. 9 again, the second electrode of the first drive transistor M5 may be electrically connected to the first drive node N1_2 through a second normally-on transistor M9. A gate electrode of the second normally-on transistor M9 is electrically connected to the second fixed potential signal line VGL, a first electrode of the second normally-on transistor M9 is electrically connected to the second electrode of the first drive transistor M5, and a second electrode of the second normally-on transistor M9 is electrically connected to the first drive node N1_2. The second normally-on transistor M9 is continuously turned on under an action of a low level provided by the second fixed potential signal line VGL, so as to improve the stability of a potential of the first drive node N1_2.

Based on a same inventive concept, an embodiment of the present disclosure further provides a method for driving the display panel described above. With reference to FIG. 6 to FIG. 8, the method includes: outputting, by the first shift circuit 3, the first scan signal SP* to the first scan line SP*; and controlling the adjusting module 11 in the pixel circuit 1 to write the bias signal provided by the adjusting line DVH into the first electrode of the drive transistor K0.

The process of outputting, by the first shift circuit 3, the first scan signal SP* to the first scan line SP* includes: writing, by the first control module 31, the first shift control signal IN1 provided by the first shift control line IN1 into the first shift control line IN1 in response to the first type-A clock signal CK1 provided by the first type-A clock line; and writing, by the first output module 32, the first type-B clock signal XCK1 provided by the first type-B clock line XCK1 into the first scan line SP* in response to the signal of the first control node N1_1.

The working process of the first shift circuit 3 has been described in detail in the above embodiments, and will not be repeated herein.

According to the method described above, a trailing can be avoided when the signal output by the first shift circuit 3 jumps from a high level to a low level; meanwhile, the duration of a low level output by the first shift circuit 3 is not an integer multiple of the row duration H. Therefore, when configuring the timing of the light-emitting control signal Emit, the duration of a high level in the light-emitting control signal Emit can be correspondingly reduced, thereby increasing the proportion of the light-emitting duration within one frame time. Therefore, the light-emitting brightness of light-emitting element can be effectively increased, without needing to increase the power supply voltage to increase the light-emitting brightness, thereby reducing the power consumption of the display panel.

In an embodiment, in combination with FIG. 1, FIG. 6, FIG. 9 and FIG. 10, the pixel circuit 1 further includes a data writing module 12, and the data writing module 12 is electrically connected to the second scan line SP, the data line Data and the first electrode of the drive transistor K0, respectively.

The display panel further includes cascaded second shift circuits 4. The second shift circuit 4 is electrically connected to the second scan line SP. The second shift circuit 4 includes a first drive module 41 and a third output module 42. The first drive module 41 is electrically connected to the second type-A clock line CK2, the second shift control line IN2 and the first drive node N1_2, respectively. The third output module 42 is electrically connected to the first drive node N1_2, the second type-B clock line XCK2 and the second scan line SP, respectively.

The method further includes: outputting, by the second shift circuit 4, a second scan signal SP to the second scan line SP; and controlling the data writing module 12 in the pixel circuit 1 to write the data voltage provided by the data line Data into the first electrode of the drive transistor K0.

The process of outputting, by the second shift circuit 4, the first scan signal SP* to the second scan line SP includes: writing, by the first drive module 41, the shift control signal provided by the second shift control line IN2 into the first drive node N1_2 in response to the second type-A clock signal CK2 provided by the second type-A clock line CK2; and writing, by the third output module 42, the second type-B clock signal XCK2 provided by the second type-B clock line XCK2 into the second scan line SP in response to the signal of the first drive node N1_2.

In this embodiment, the second scan line SP and the first scan line SP* correspond to a same type of shift circuit. FIG. 10 is a timing diagram corresponding to a second shift circuit 4 according to an embodiment of the present disclosure. Combined with the analysis of the working process of the first shift circuit 3 described above, as shown in FIG. 10, by using the second shift circuit 4 to transmit the signal to the second scan line SP, a trailing of the second scan signal SP can be avoided, and the duration of a single low level in the second scan signal SP does not need to be an integer multiple of the row duration H. Since the second scan signal SP is used to control the charging of the pixel circuit 1, avoiding the trailing of the second scan signal SP can effectively improve the stability of the second scan signal SP, thereby improving the charging reliability of the pixel circuit 1, and improving the control of the light-emitting state of the light-emitting element.

In an embodiment, in combination with FIG. 1, FIG. 6 and FIG. 11, the pixel circuit 1 further includes a threshold compensation module 13, and the threshold compensation module 13 is electrically connected to the fourth scan line S2N1, the second electrode of the drive transistor K0, and the gate electrode of the drive transistor K0, respectively. The display panel further includes fourth shift circuits 5 that are cascaded. The fourth shift circuit 5 is electrically connected to the fourth scan line S2N1.

The driving cycle of the pixel circuit 1 includes a first adjustment period T1, an charging period T2, and a second adjustment period T3. The first adjustment period T1 is before the charging period T2, and the second adjustment period T3 is after the charging period T2.

During the first adjustment period T1 and the second adjustment period T3, the first shift circuit 3 outputs a first enable level to the first scan line SP*, and the adjusting module 11 is controlled to write a bias signal provided by the adjusting line DVH into the first electrode of the drive transistor K0. During the charging period T2, the second shift circuit 4 outputs a second enable level to the second scan line SP, the fourth shift circuit 5 outputs a fourth enable level to the fourth scan line S2N1, and each of the data writing module 12 and the threshold compensation module 13 is controlled to write a data signal provided by the data line Data into the gate electrode of the drive transistor K0.

Based on the above-mentioned configuration, the first adjustment period T1 is before the charging period T2 and the adjusting module 11 is used to refresh a potential of the drive transistor K0, so that the device characteristics of the drive transistor K0 can be configured as a certain initial state, thereby eliminating an influence of a data signal written within a previous frame on the device characteristics of drive transistor K0. The second adjustment period T3 is after the charging period T2, so that the adjusting module 11 can be used again to write a bias voltage into the drive transistor K0, and a bias state of the drive transistor K0 can be close to that of the drive transistor K0 when the data voltage is just written, thereby further improving the stability of the working state of the drive transistor K0.

Therefore, the above-mentioned configuration can better adjust a bias state of the drive transistor K0 and improve the working stability of the drive transistor K0 to a greater extent.

Further, referring to FIG. 1 and FIG. 6, the pixel circuit 1 further includes a gate reset module 14, which is electrically connected to the third scan line S1N1, the reset line Vref, and the agate electrode of the drive transistor K0, respectively. The display panel further includes cascaded third shift circuits 6. The third shift circuit 6 is electrically connected to the third scan line S1N1.

In combination with FIG. 13, during the first adjustment period T1, the third shift circuit 6 outputs a third enable level to the third scan line S1N1, and the gate reset module 14 is controlled to write a reset signal provided by the reset line Vref into the gate electrode of the drive transistor K0.

According to this method, during the first adjustment period T1, the gate reset module 14 writes a reset voltage into the gate electrode of the drive transistor K0 to turn on the drive transistor K0; and at the same time, the adjusting module 11 writes a bias voltage into the first electrode of the drive transistor K0, and the bias voltage can be further written into the second electrode of the drive transistor K0 through the turned-on drive transistor K0, so that each of a potential of the first electrode and a potential of the second electrode of the drive transistor K0 can be refreshed by using the bias voltage.

Moreover, since the reset voltage is low and the bias voltage is high, there is a large voltage difference between the gate electrode and the first electrode of the drive transistor K0 during this period, and the adjusting module 11 can adjust the bias state of the drive transistor K0 more thoroughly. An influence of the data signal written within a previous frame on the device characteristics of the drive transistor K0 can be eliminated to a greater extent.

Or, referring to FIG. 15, the driving cycle of the pixel circuit 1 further includes an initialization period T4 before the first adjustment period T1. During the initialization period T4, the third shift circuit 6 outputs a third enable level to the third scan line S1N1, and the gate reset module 14 is controlled to write a reset signal provided by the reset line Vref into the gate electrode of the drive transistor K0. During the first adjustment period T1, the fourth shift circuit 5 outputs a fourth enable level to the fourth scan line S2N1, and the threshold compensation module 13 is controlled to write a bias signal of the second electrode of the drive transistor K0 into the gate electrode of the drive transistor K0.

According to the method described above, during the initialization period T4, the gate reset module 14 writes a reset voltage to the gate electrode of the drive transistor K0 to control the drive transistor K0 to be turned on. Then, during the subsequent first adjustment period T1, the adjusting module 11 writes a bias voltage into the first electrode of the drive transistor K0, and the bias voltage is further written into the second electrode of the drive transistor K0 through the turned-on drive transistor K0. Further, since the threshold compensation module 13 can control a path between the second electrode and the gate electrode of the drive transistor K0 to be conductive during this period, the bias voltage can be further written into the gate electrode of the drive transistor K0. Therefore, a potential of each electrode of the drive transistor K0 is refreshed. Thus, the device characteristics of the drive transistor K0 are configured as a certain initial state.

Moreover, the initialization period T4 is before the first adjustment period T1, therefore, before the adjusting module 11 performs a first bias adjustment on the drive transistor K0, the gate reset module 14 can be used to write a uniform reset voltage to the gate electrode of the drive transistor K0. In an aspect, as described above, the reset voltage can be used to control the drive transistor K0 to be turned on, and the voltage can be further written into the second electrode after the bias voltage is written into the first electrode of the drive transistor K0. In another aspect, when the threshold compensation module 13 subsequently writes the bias voltage into the gate electrode of the drive transistor K0, it is written on the basis of the reset voltage, which can make the final written bias voltage more uniform, thereby achieving the consistency in the adjustment of the bias state of the drive transistor K0 in each of different pixel circuits 1.

Or, referring to FIG. 16, the driving cycle of the pixel circuit 1 further includes an initialization period T4 between the first adjustment period T1 and the charging period T2. During the first adjustment period T1, the fourth shift circuit 5 outputs a fourth enable level to the fourth scan line S2N1, and the threshold compensation module 13 is controlled to write a bias signal of the second electrode of the drive transistor K0 into the gate electrode of the drive transistor K0. During the initialization period T4, the third shift circuit 6 outputs a third enable level to the third scan line S1N1, and the gate reset module 14 is controlled to write a reset signal provided by the reset line Vref into the gate electrode of the drive transistor K0.

According to the method described above, during the first adjustment period T1, the drive transistor K0 is turned on under an action of the residual potential of a previous frame, the adjusting module 11 writes a bias voltage into the first electrode of the drive transistor K0, and the bias voltage is further written into the second electrode of the drive transistor K0 through the turned-on drive transistor K0. Further, since the threshold compensation module 13 can control a path between the second electrode and the gate electrode of the drive transistor K0 to be conductive during this period, the bias voltage can be further written into the gate electrode of the drive transistor K0. Therefore, a potential of each electrode of the drive transistor K0 is refreshed. Thus, the device characteristics of the drive transistor K0 are configured as a certain initial state.

The initialization period T4 is before the charging period T2, so that the gate reset module 14 can be controlled to reset a potential of the gate electrode of the drive transistor K0, thereby achieving initialization of the potential of the gate electrode of the drive transistor K0. Therefore, the stability of the subsequent charging of the pixel circuit 1 can be improved.

In an embodiment, the adjusting line DVH provides a first bias voltage V1 during the first adjustment period T1, and the first bias voltage V1 is greater than or equal to a black state voltage.

Before charging the drive transistor K0, the adjusting module 11 is used to write a first bias voltage V1 greater than or equal to the black state voltage into the drive transistor K0, so that an influence of an image displayed within a previous frame on an image displayed in the current frame can be eliminated. Therefore, the hysteresis and smear of the image displayed on the display panel can be alleviated.

And/or, the adjusting line DVH provides a second bias voltage V2 during the second adjustment period T3, and the second bias voltage V2 is smaller than or equal to the data voltage corresponding to a first gray scale, which is smaller than or equal to 10 gray scales.

In the above-mentioned configuration, the second bias voltage V2 is a fixed voltage, that is, when the display panel displays images in different frames, the adjusting line DVH provides a same second bias voltage V2 during the second adjustment period T3. It can be understood that the darker an image displayed on the display panel, the more obvious the brightness change caused by the unstable working state of the drive transistor K0, and the easier it is to be seen by the human eye. Therefore, when the second voltage bias voltage V2 is a fixed voltage, the second bias voltage V2 can be configured as a data voltage corresponding to a low gray scale, so that the bias state of the drive transistor K0 displayed at a low gray scale can be more significantly adjusted, thereby improving the image display effect at a low gray scale to a greater extent.

In an embodiment, as shown in FIG. 19, the period of the first type-B clock signal XCK1 is k1, the period of the second type-B clock signal XCK2 is k2, and k1>k2.

In the embodiments of the present disclosure, by increasing the cycle of the first type-A clock signal CK1 and the first type-B clock signal XCK1, the first shift circuit 3 can output a low level to the first scan line SP* for a long period. In an aspect, this is beneficial to increasing the total duration during which the drive transistor K0 is adjusted by the adjusting module 11, moreover, during the first adjustment period T1 and/or the second adjustment period T3, the adjusting module 11 can continuously adjust the drive transistor K0, and the adjustment effect is better. In another aspect, the total duration required for the first adjustment period T1 and/or the second adjustment period T3 is shorter, so the period of a high level in the second scan signal SP and the light-emitting control signal Emit can be reduced. In still another aspect, the duration of a low level output by the first shift circuit 3 is determined by the duration of a low level in the first type-B clock signal XCK1, therefore, if the duration of the low level output by the first shift circuit 3 needs to be adjusted, it only needs to adjust the duration of the low level in the first type-B clock signal XCK1, and the adjustment method thereof is more flexible and convenient.

In an embodiment, in combination with FIG. 14 and FIG. 17, the first type-B clock signal XCK1 includes first enable levels (low levels) and first non-enable levels (high levels) that are alternated, and the duration of a single first enable level (low level)) is greater than or equal to one row duration H, so that the adjusting duration during which the drive transistor K0 is adjusted by the adjusting module 11 can be effectively increased, and the working stability of the drive transistor K0 can be further improved. Here, the row duration H refers to the minimum interval between a falling edge of the second type-A clock signal CK2 and a falling edge of second type-B clock signal XCK2.

Figure 22:
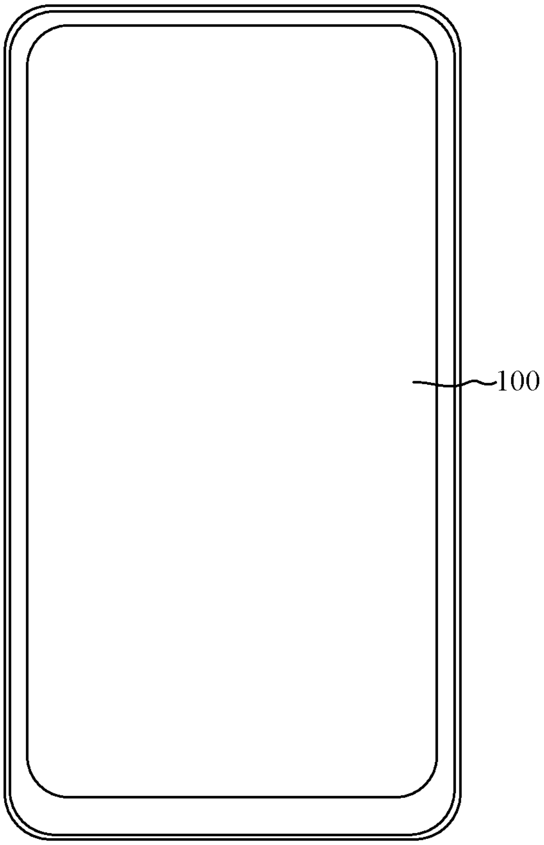
FIG. 22 is a schematic structural diagram of a display device according to an embodiment of the present disclosure.

Based on a same inventive concept, an embodiment of the present disclosure further provides a display device. FIG. 22 is a schematic structural diagram of a display device according to an embodiment of the present disclosure. The display device includes the display panel 100 described above. A specific structure of the display panel 100 has been described in detail in the embodiments described above, and will not be repeated herein. It should be noted that, the display device shown in FIG. 22 is merely a schematic illustration, and the display device may be any electronic device having a display function, such as a mobile phone, a tablet computer, a notebook computer, an electronic paper book, or a television.

The above-described embodiments are merely preferred embodiments of the present disclosure and are not intended to limit the present disclosure. Any modifications, equivalent substitutions and improvements made within the principle of the present disclosure shall fall into the protection scope of the present disclosure.

Finally, it should be noted that, the above-described embodiments are merely for illustrating the present disclosure but not intended to provide any limitation. Although the present disclosure has been described in detail with reference to the above-described embodiments, it should be understood by those skilled in the art that, it is still possible to modify the technical solutions described in the above embodiments or to equivalently replace some or all of the technical features therein, but these modifications or replacements do not cause the essence of corresponding technical solutions to depart from the scope of the present disclosure.

What is claimed is:

1. A display panel, comprising:

a pixel circuit comprising a drive transistor and an adjusting module, wherein the adjusting module is electrically connected to a first scan line, an adjusting line and a first electrode of the drive transistor; and first shift circuits that are cascaded, wherein each of the first shift circuits is electrically connected to the first scan line and comprises a first control module and a first output module, wherein the first control module is electrically connected to a first type-A clock line, a first shift control line and a first control node; and the first control module is configured to write a first shift control signal provided by the first shift control line into the first control node in response to a first type-A clock signal provided by the first type-A clock line; and wherein the first output module is electrically connected to the first control node, a first type-B clock line and the first scan line, and the first output module is configured to write a first type-B clock signal provided by the first type-B clock line into the first scan line in response to a signal of the first control node;

when the first shift control line provides a low level, the first type-A clock line provides a low level, and the first type-B clock line provides a high level, the first control module controls a path between the first shift control line and the first control node to be conductive in response to the low level provided by the first type-A clock line, and the low level provided by the first shift control line is written into the first node, the first output module controls a path between the first type-B clock line and the first scan line to be conductive in response to a low level, and the high level provided by the first type-B clock line is transmitted to the first scan line, to make the first scan line output a high level.

2. A display panel, comprising:

a pixel circuit comprising a drive transistor and an adjusting module, wherein the adjusting module is electrically connected to a first scan line, an adjusting line and a first electrode of the drive transistor; and first shift circuits that are cascaded, wherein each of the first shift circuits is electrically connected to the first scan line and comprises a first control module and a first output module, wherein the first control module is electrically connected to a first type-A clock line, a first shift control line and a first control node; and the first control module is configured to write a first shift control signal provided by the first shift control line into the first control node in response to a first type-A clock signal provided by the first type-A clock line; and wherein the first output module is electrically connected to the first control node, a first type-B clock line and the first scan line, and the first output module is configured to write a first type-B clock signal provided by the first type-B clock line into the first scan line in response to a signal of the first control node;

wherein the pixel circuit further comprises a data writing module, and wherein the data writing module is electrically connected to a second scan line, a data line and the first electrode of the drive transistor;

wherein the display panel further comprises second shift circuits that are cascaded, each of the second shift circuits is electrically connected to the second scan line and comprises a first drive module and a third output module, wherein the first drive module is electrically connected to a second type-A clock line, a second shift control line and a first drive node, and the first drive module is configured to write a second shift control signal provided by the second shift control line into the first drive node in response to a second type-A clock signal output by the second type-A clock line; and wherein the third output module is electrically connected to the first drive node, a second type-B clock line and the second scan line; and the third output module is configured to write a second type-B clock signal provided by the second type-B clock line into the second scan line in response to a signal of the first drive node.

3. The display panel according to claim 2, wherein the pixel circuit further comprises a threshold compensation module, and the threshold compensation module is electrically connected to a fourth scan line, a second electrode of the drive transistor and a gate electrode of the drive transistor;

wherein the display panel further comprises fourth shift circuits that are cascaded, and each of the fourth shift circuits is electrically connected to the fourth scan line;

wherein a driving cycle of the pixel circuit comprises a first adjustment period, a charging period, and a second adjustment period; and the first adjustment period is before the charging period, and the second adjustment period is after the charging period;

wherein each of the first shift circuits outputs a first enable level to the first scan line such that the adjusting module is controlled to write a bias signal provided by the adjusting line into the first electrode of the drive transistor during the first adjustment period and during the second adjustment period; and wherein the second shift circuit outputs a second enable level to the second scan line, the fourth shift circuit outputs a fourth enable level to the fourth scan line, such that the data writing module and the threshold compensation module are controlled to write a data signal provided by the data line into the gate electrode of the drive transistor during the charging period.

4. The display panel according to claim 3, wherein the pixel circuit further comprises a gate reset module, and the gate reset module is electrically connected to a third scan line, a reset line and the gate electrode of the drive transistor;

wherein the display panel further comprises third shift circuits that are cascaded, and each of the third shift circuits is electrically connected to the third scan line; and wherein the third shift circuit outputs a third enable level to the third scan line such that the gate reset module is controlled to write a reset signal provided by the reset line into the gate electrode of the drive transistor during the first adjustment period.

5. The display panel according to claim 3, wherein the pixel circuit further comprises a gate reset module, and the gate reset module is electrically connected to a third scan line, a reset line and the gate electrode of the drive transistor;

wherein the display panel further comprises third shift circuits that are cascaded, and each of the third shift circuits is electrically connected to the third scan line;

wherein the driving cycle of the pixel circuit further comprises an initialization period before the first adjustment period; and wherein the third shift circuit outputs a third enable level to the third scan line, such that the gate reset module is controlled to write a reset signal provided by the reset line into the gate electrode of the drive transistor during the initialization period; and the fourth shift circuit outputs a fourth enable level to the fourth scan line such that the threshold compensation module is controlled to write a bias signal of the second electrode of the drive transistor into the gate electrode of the drive transistor during the first adjustment period.

6. The display panel according to claim 3, wherein the pixel circuit further comprises a gate reset module, and the gate reset module is electrically connected to a third scan line, a reset line and the gate electrode of the drive transistor;

wherein the display panel further comprises third shift circuits that are cascaded, and each of the third shift circuits is electrically connected to the third scan line;

wherein the driving cycle of the pixel circuit further comprises an initialization period between the first adjustment period and the charging period; and wherein the fourth shift circuit outputs a fourth enable level to the fourth scan line such that the threshold compensation module is controlled to write a bias signal of the second electrode of the drive transistor into the gate electrode of the drive transistor during the first adjustment period; and the third shift circuit outputs a third enable level to the third scan line such that the gate reset module is controlled to write a reset signal provided by the reset line into the gate electrode of the drive transistor during the initialization period.

7. The display panel according to claim 3, wherein the pixel circuit further comprises a gate reset module, and the gate reset module is electrically connected to a third scan line, a reset line and the gate electrode of the drive transistor;

wherein the display panel further comprises third shift circuits that are cascaded, and each of the third shift circuits is electrically connected to the third scan line;

wherein the driving cycle of the pixel circuit further comprises a reset period between the first adjustment period and the charging period; and wherein the third shift circuit outputs a third enable level to the third scan line, such that the gate reset module is controlled to write a reset signal provided by the reset line into the gate electrode of the drive transistor, and the fourth shift circuit outputs a fourth enable level to the fourth scan line such that the threshold compensation module is controlled to write a reset signal of the gate electrode of the drive transistor into the second electrode of the drive transistor during the reset period.

8. The display panel according to claim 3, wherein the adjusting line provides a first bias voltage during the first adjustment period and provides a second bias voltage during the second adjustment period, and the first bias voltage is the same as the second bias voltage.

9. The display panel according to claim 3, wherein the adjusting line provides a first bias voltage during the first adjustment period and provides a second bias voltage during the second adjustment period, and the first bias voltage is different from the second bias voltage.

10. The display panel according to claim 3, wherein the adjusting line provides a first bias voltage during the first adjustment period, and the first bias voltage is greater than or equal to a black state voltage.

11. The display panel according to claim 3, wherein the adjusting line provides a second bias voltage during the second adjustment period, and the second bias voltage is equal to a voltage of the data signal transmitted by the data line during the charging period.

12. The display panel according to claim 3, wherein the adjusting line provides a second bias voltage during the second adjustment period, and the second bias voltage is smaller than or equal to a data voltage corresponding to a first gray level, and the first gray level is smaller than or equal to 10 gray levels.

13. The display panel according to claim 2, wherein a period k1 of the first type-B clock signal and a period k2 of the second type-B clock signal satisfy k1>k2.

14. The display panel according to claim 2, wherein the first type-B clock signal comprises first enable levels and first non-enable levels that are alternated, and a duration of a single first enable level is greater than or equal to a row duration, the row duration is a minimum time interval between a falling edge of the second type-A clock signal and a falling edge of the second type-B clock signal.

15. The display panel according to claim 1, wherein the first control module comprises a first control transistor, the first control transistor has a gate electrode electrically connected to the first type-A clock line, a first electrode electrically connected to the first shift control line, and a second electrode electrically connected to the first control node; and wherein the first output module comprises a first output transistor, the first output transistor has a gate electrode electrically connected to the first control node, a first electrode electrically connected to the first type-B clock line, and a second electrode electrically connected to the first scan line.

16. The display panel of claim 1, wherein each of the first shift circuits further comprises: a second control module, a third control module, and a second output module;

wherein the second control module is electrically connected to a second control node, a first fixed potential signal line, the first type-B clock line and the first control node; and the second control module is configured to write a first fixed potential signal provided by the first fixed potential signal line into the first control node in response to a signal of the second control node and the first type-B clock signal;

wherein the third control module is electrically connected to the first type-A clock line, the first control node, the second fixed potential signal line and the second control node; and the third control module is configured to write the first type-A clock signal into the second control node in response to the signal of the first control node, or the third control module is configured to write a second fixed potential signal provided by the second fixed potential signal line into the second control node in response to the first type-A clock signal; and wherein the second output module is electrically connected to the second control node, the first fixed potential signal line and the first scan line; and the second output module is configured to write the first fixed potential signal into the first scan line in response to a signal of the second control node.

17. The display panel according to claim 16, wherein the second control module comprises a second control transistor and a third control transistor; a gate electrode of the second control transistor is electrically connected to the second control node, and a first electrode of the second control transistor is electrically connected to the first fixed potential signal line; and a gate electrode of the third control transistor is electrically connected to the first type-B clock line, a first electrode of the third control transistor is electrically connected to a second electrode of the second control transistor, and a second electrode of the third control transistor is electrically connected to the second control node;

wherein the third control module comprises a fourth control transistor and a fifth control transistor; a gate electrode of the fourth control transistor is electrically connected to the first type-A clock line, a first electrode of the fourth control transistor is electrically connected to the second fixed potential signal line, and a second electrode of the fourth control transistor is electrically connected to the second control node; and a gate electrode of the fifth control transistor is electrically connected to the first control node, a first electrode of the fifth control transistor is electrically connected to the first type-A clock line, and a second electrode of the fifth control transistor is electrically connected to the first control node; and wherein the second output module comprises a second output transistor, a gate electrode of the second output transistor is electrically connected to the second control node, a first electrode of the second output transistor is electrically connected to the first fixed potential signal line, and a second electrode of the second output transistor is electrically connected to the first scan line.

18. A method for driving a display panel, wherein the display panel comprises:

a pixel circuit comprising a drive transistor and an adjusting module, wherein the adjusting module is electrically connected to a first scan line, an adjusting line and a first electrode of the drive transistor; and first shift circuits that are cascaded, wherein each of the first shift circuits is electrically connected to the first scan line and comprises a first control module and a first output module, wherein the first control module is electrically connected to a first type-A clock line, a first shift control line and a first control node; and the first control module is configured to write a first shift control signal provided by the first shift control line into the first control node in response to a first type-A clock signal provided by the first type-A clock line; and wherein the first output module is electrically connected to the first control node, a first type-B clock line and the first scan line, and the first output module is configured to write a first type-B clock signal provided by the first type-B clock line into the first scan line in response to a signal of the first control node;

wherein the method comprises: outputting, by each of the first shift circuits, a first scan signal to the first scan line; and controlling the adjusting module in the pixel circuit to write a bias signal provided by the adjusting line into the first electrode of the drive transistor; and wherein, said outputting, by each of the first shift circuits, the first scan signal to the first scan line comprises: writing, by the first control module, the first shift control signal provided by the first shift control line into the first control node in response to the first type-A clock signal provided by the first type-A clock line; and writing, by the first output module, the first type-B clock signal provided by the first type-B clock line in response to a signal of the first control node.

19. The method according to claim 18, wherein the pixel circuit further comprises a data writing module, and the data writing module is electrically connected to a second scan line, a data line and the first electrode of the drive transistor; and wherein the display panel further comprises second shift circuits that are cascaded, and each of the second shift circuits is electrically connected to the second scan line and comprises a first drive module and a third output module; wherein the first drive module is electrically connected to a second type-A clock line, a second shift control line and a first drive node, and the third output module is electrically connected to the first drive node, a second type-B clock line and the second scan line;

wherein the method further comprises: outputting, by each of the second shift circuits, a second scan signal to the second scan line; and controlling the data writing module in the pixel circuit to write a data voltage provided by the data line into the first electrode of the drive transistor; and wherein, said outputting, by each of the second shift circuits, the second scan signal to the second scan line comprises: writing, by the first drive module, a shift control signal provided by the second shift control line into the first drive node in response to a second type-A clock signal provided by the second type-A clock line; writing, by the third output module, a second type-B clock signal provided by the second type-B clock line into the second scan line in response to a signal of the first drive node.

20. The method according to claim 19, wherein the pixel circuit further comprises a threshold compensation module, and the threshold compensation module is electrically connected to a fourth scan line, a second electrode of the drive transistor and a gate electrode of the drive transistor;

wherein the display panel further comprises fourth shift circuits that are cascaded, and each of the fourth shift circuits is electrically connected to the fourth scan line;

wherein a driving cycle of the pixel circuit comprises a first adjustment period, an charging period, and a second adjustment period, and the first adjustment period is before the charging period, and the second adjustment period is after the charging period;

wherein each of the first shift circuits outputs a first enable level to the first scan line such that the adjusting module is controlled to write a bias signal provided by the adjusting line into the first electrode of the drive transistor during the first adjustment period and during the second adjustment period; and wherein the second shift circuit outputs a second enable level to the second scan line, the fourth shift circuit outputs a fourth enable level to the fourth scan line, such that the data writing module and the threshold compensation module are controlled to write a data signal provided by the data line into the gate electrode of the drive transistor during the charging period.

21. The method according to claim 20, wherein the pixel circuit further comprises a gate reset module, and a gate reset module is electrically connected to a third scan line, a reset line and the gate electrode of the drive transistor;

wherein the display panel further comprises third shift circuits that are cascaded, and each of the third shift circuits is electrically connected to the third scan line;

wherein the third shift circuit outputs a third enable level to the third scan line such that the gate reset module is controlled to write a reset signal provided by the reset line into the gate electrode of the drive transistor during the first adjustment period;

or, the driving cycle of the pixel circuit further comprises an initialization period before the first adjustment period; wherein the third shift circuit outputs the third enable level to the third scan line such that the gate reset module is controlled to write a reset signal provided by the reset line into the gate electrode of the drive transistor during the initialization period before the first adjustment period; and the fourth shift circuit outputs a fourth enable level to the fourth scan line such that the threshold compensation module is controlled to write a bias signal of the second electrode of the drive transistor into the gate electrode of the drive transistor during the first adjustment period;

or, the driving cycle of the pixel circuit further comprises an initialization period between the first adjustment period and the charging period; wherein the fourth shift circuit outputs a fourth enable level to the fourth scan line such that the threshold compensation module is controlled to write a bias signal of the second electrode of the drive transistor into a gate of the drive transistor during the first adjustment period; and the third shift circuit outputs the third enable level to the third scan line such that the gate reset module is controlled to write a reset signal provided by the reset line into the gate electrode of the drive transistor during the initialization period between the first adjustment period and the charging period.

22. The method according to claim 20, wherein the adjusting line provides a first bias voltage during the first adjustment period, and the first bias voltage is greater than or equal to a black state voltage; and/or the adjusting line provides a second bias voltage during the second adjustment period, and the second bias voltage is smaller than or equal to a data voltage corresponding to a first gray level, and the first gray level is smaller than or equal to 10 gray levels.

23. The method according to claim 19, wherein a period k1 of the first type-B clock signal and a period k2 of the second type-B clock signal satisfy k1>k2.

24. The method according to claim 19, wherein the first type-B clock signal comprises first enable levels and first non-enable levels that are alternated, and a duration of a single first enable level is greater than or equal to a row duration, the row duration is a minimum time interval between a falling edge of the second type-A clock signal and a falling edge of the second type-B clock signal.

25. A display device, comprising a display panel, wherein the display panel comprises:

a pixel circuit comprising a drive transistor and an adjusting module, wherein the adjusting module is electrically connected to a first scan line, an adjusting line and a first electrode of the drive transistor; and first shift circuits that are cascaded, wherein each of the first shift circuits is electrically connected to the first scan line and comprises a first control module and a first output module, wherein the first control module is electrically connected to a first type-A clock line, a first shift control line and a first control node; and the first control module is configured to write a first shift control signal provided by the first shift control line into the first control node in response to a first type-A clock signal provided by the first type-A clock line; and wherein the first output module is electrically connected to the first control node, a first type-B clock line and the first scan line, and the first output module is configured to write a first type-B clock signal provided by the first type-B clock line into the first scan line in response to a signal of the first control node;

when the first shift control line provides a low level, the first type-A clock line provides a low level, and the first type-B clock line provides a high level, the first control module controls a path between the first shift control line and the first control node to be conductive in response to the low level provided by the first type-A clock line, and the low level provided by the first shift control line is written into the first node, the first output module controls a path between the first type-B clock line and the first scan line to be conductive in response to a low level, and the high level provided by the first type-B clock line is transmitted to the first scan line, to make the first scan line output a high level.

* * * * *